United States Patent
Song et al.

(10) Patent No.: US 8,594,006 B2
(45) Date of Patent: Nov. 26, 2013

(54) SETTING UP A MULTICAST GROUP COMMUNICATION SESSION WITHIN A WIRELESS COMMUNICATIONS SYSTEM

(75) Inventors: Bongyong Song, San Diego, CA (US); Yih-Hao Lin, San Diego, CA (US); Lin Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 563 days.

(21) Appl. No.: 12/694,997

(22) Filed: Jan. 27, 2010

(65) Prior Publication Data

US 2011/0182225 A1 Jul. 28, 2011

(51) Int. Cl.
*H04H 20/71* (2008.01)
*H04B 7/00* (2006.01)

(52) U.S. Cl.
USPC .......................................... 370/312; 455/518

(58) Field of Classification Search
None
See application file for complete search history.

(56) References Cited

U.S. PATENT DOCUMENTS

| | | | |
|---|---|---|---|
| 5,589,872 A | 12/1996 | Martinez | |
| 6,839,565 B2 | 1/2005 | Sarkkinen et al. | |
| 6,862,264 B1 | 3/2005 | Moura et al. | |
| 7,013,157 B1 | 3/2006 | Norman et al. | |
| 7,185,099 B1 | 2/2007 | Block | |
| 2005/0111394 A1 | 5/2005 | Jung et al. | |
| 2005/0281208 A1 | 12/2005 | Dorenbosch et al. | |
| 2006/0034241 A1 | 2/2006 | Czaja et al. | |
| 2006/0046762 A1 | 3/2006 | Yoon et al. | |
| 2006/0098616 A1 | 5/2006 | Kish et al. | |
| 2006/0109859 A1 | 5/2006 | Acharya et al. | |
| 2006/0253601 A1 | 11/2006 | Vedantham et al. | |
| 2007/0049314 A1 | 3/2007 | Balachandran et al. | |
| 2007/0076739 A1 | 4/2007 | Manjeshwar et al. | |
| 2007/0086382 A1 | 4/2007 | Narayanan et al. | |
| 2007/0192832 A1 | 8/2007 | Qi et al. | |
| 2007/0195769 A1 | 8/2007 | Lin | |
| 2007/0280153 A1 | 12/2007 | Sinha | |

(Continued)

FOREIGN PATENT DOCUMENTS

| | | |
|---|---|---|
| CN | 1023617 C | 1/1994 |
| EP | 0731578 A2 | 9/1996 |

(Continued)

OTHER PUBLICATIONS

CDMA2000 High Rate Broadcast-Multicast Packet Data Air Interface Specification, dated Feb. 14, 2006, Version 1.0 C.S0054-A.

(Continued)

*Primary Examiner* — Clemence Han
(74) *Attorney, Agent, or Firm* — Raphael Freiwirth

(57) ABSTRACT

In an embodiment, a multicast communication session is setup at an access network within a wireless communications system, whereby the access network transmits an announce message announcing a current multicast communication session to a given group of access terminals within an initial cluster of sectors. The access network receives a registration request for the current multicast communication session from an access terminal, and selectively loads a stored cluster of sectors that supported a previous multicast communication session to the given group. The access network then turns on a multicast flow for the current multicast communication session within each sector of the stored cluster. In another embodiment, a multicast communication session is terminated whereby the access network stories a formation of the engaged cluster at or near the termination of the current multicast communication session, which can then be used during setup of a subsequent multicast communication session.

27 Claims, 15 Drawing Sheets

(56) References Cited

U.S. PATENT DOCUMENTS

| | | |
|---|---|---|
| 2007/0281722 A1* | 12/2007 | Gao .................... 455/518 |
| 2007/0281726 A1 | 12/2007 | Rey et al. |
| 2008/0123578 A1 | 5/2008 | Golitschek Edler Von Elbwart et al. |
| 2008/0181163 A1 | 7/2008 | Ye et al. |
| 2008/0310324 A1 | 12/2008 | Chaponniere |
| 2009/0080355 A1 | 3/2009 | Song |
| 2009/0080356 A1 | 3/2009 | Song et al. |
| 2009/0080359 A1* | 3/2009 | Song et al. .................... 370/312 |
| 2009/0080363 A1* | 3/2009 | Song et al. .................... 370/312 |
| 2009/0213775 A1 | 8/2009 | Rey et al. |
| 2010/0226263 A1 | 9/2010 | Chun et al. |
| 2011/0274046 A1 | 11/2011 | Rune et al. |
| 2013/0010775 A1 | 1/2013 | Kish et al. |

FOREIGN PATENT DOCUMENTS

| | | |
|---|---|---|
| EP | 1624610 A1 | 2/2006 |
| EP | 1770903 A1 | 4/2007 |
| JP | 2000115051 A | 4/2000 |
| JP | 2003511925 A | 3/2003 |
| JP | 2008509582 A | 3/2008 |
| JP | 2009517925 A | 4/2009 |
| KR | 100890060 B1 | 3/2009 |
| WO | 2006020970 | 2/2006 |

OTHER PUBLICATIONS

International Search Report and Written Opinion—PCT/US2011/022457—ISA/EPO—Apr. 19, 2011.

* cited by examiner

Initial Cluster

Initial Cluster after pruning

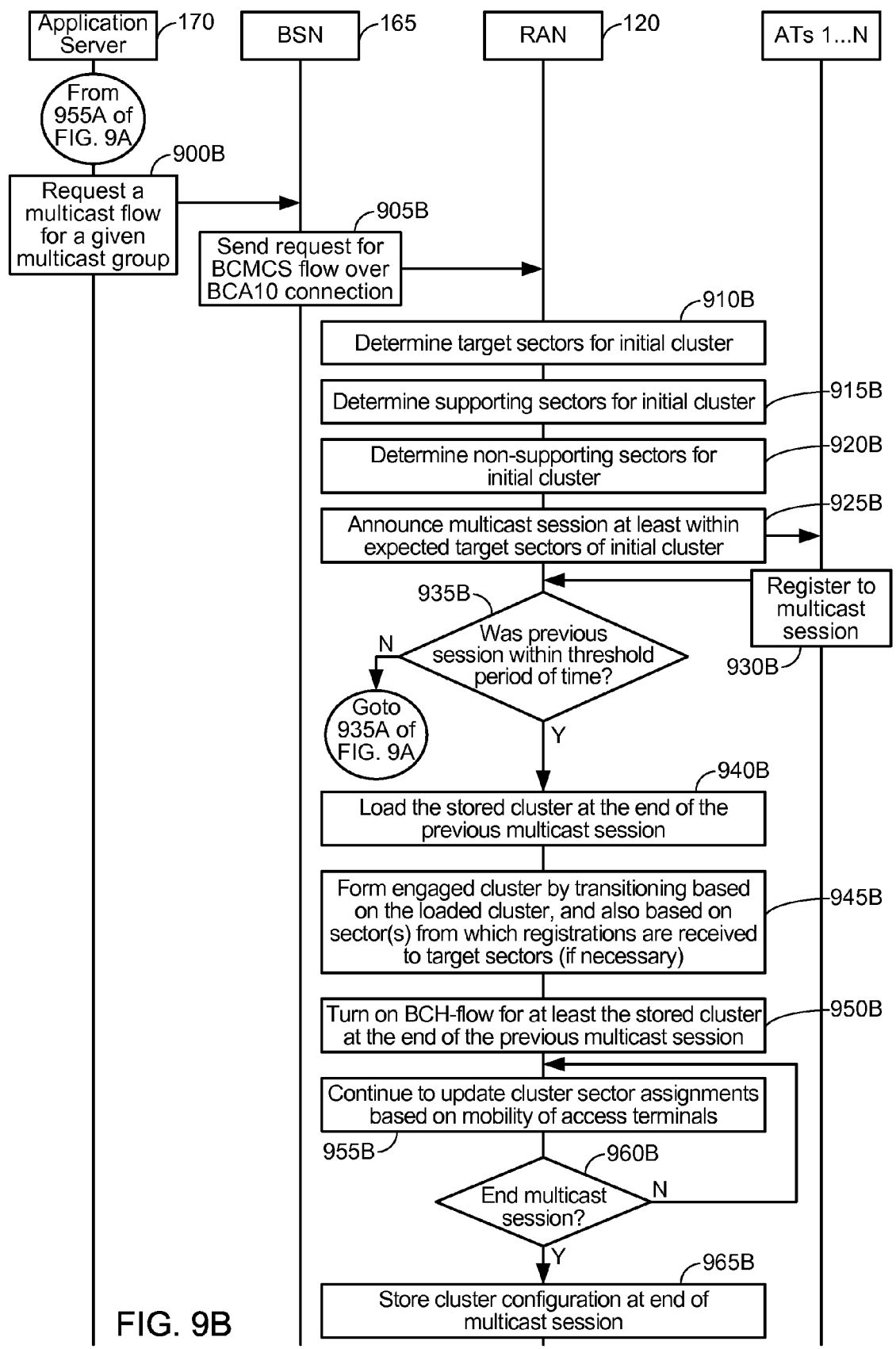

SETTING UP A MULTICAST GROUP COMMUNICATION SESSION WITHIN A WIRELESS COMMUNICATIONS SYSTEM

BACKGROUND OF THE INVENTION

1. Field of the Invention

The invention relates to communications in a wireless telecommunication system and, more particularly to setting up a multicast group communication session within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, a multicast communication session is setup at an access network within a wireless communications system, whereby the access network transmits an announce message announcing a current multicast communication session to a given group of access terminals within an initial cluster of sectors. The access network receives a registration request for the current multicast communication session from an access terminal, and selectively loads a stored cluster of sectors that supported a previous multicast communication session to the given group. The access network then turns on a multicast flow for the current multicast communication session within each sector of the stored cluster. In another embodiment, a multicast communication session is terminated whereby the access network stories a formation of the engaged cluster at or near the termination of the current multicast communication session, which can then be used during setup of a subsequent multicast communication session.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 9B illustrates a process of setting up a multicast communication session based on settings associated with a previous multicast communication session in accordance with an embodiment of the invention.

DETAILED DESCRIPTION

Figure 1:
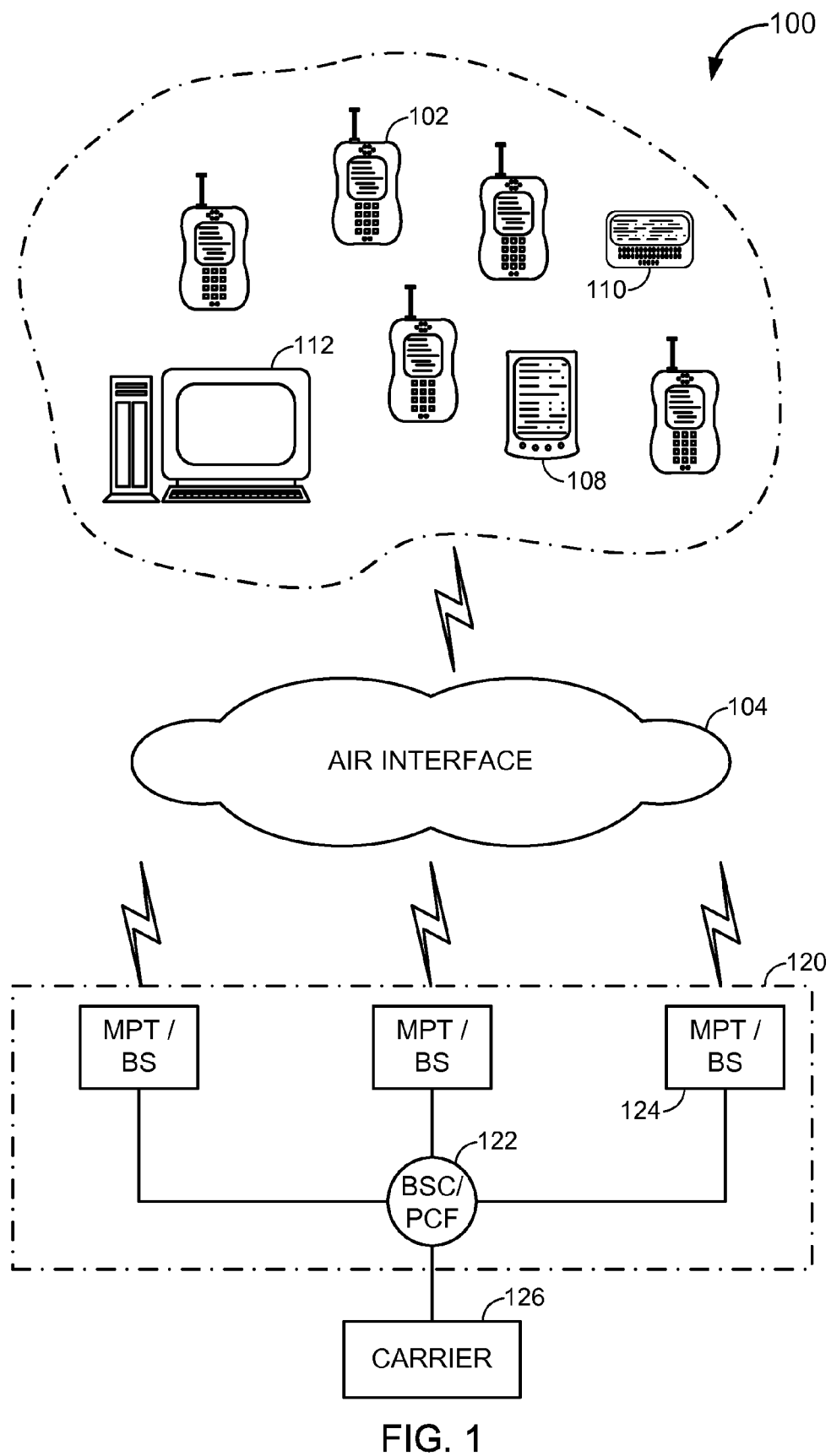
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
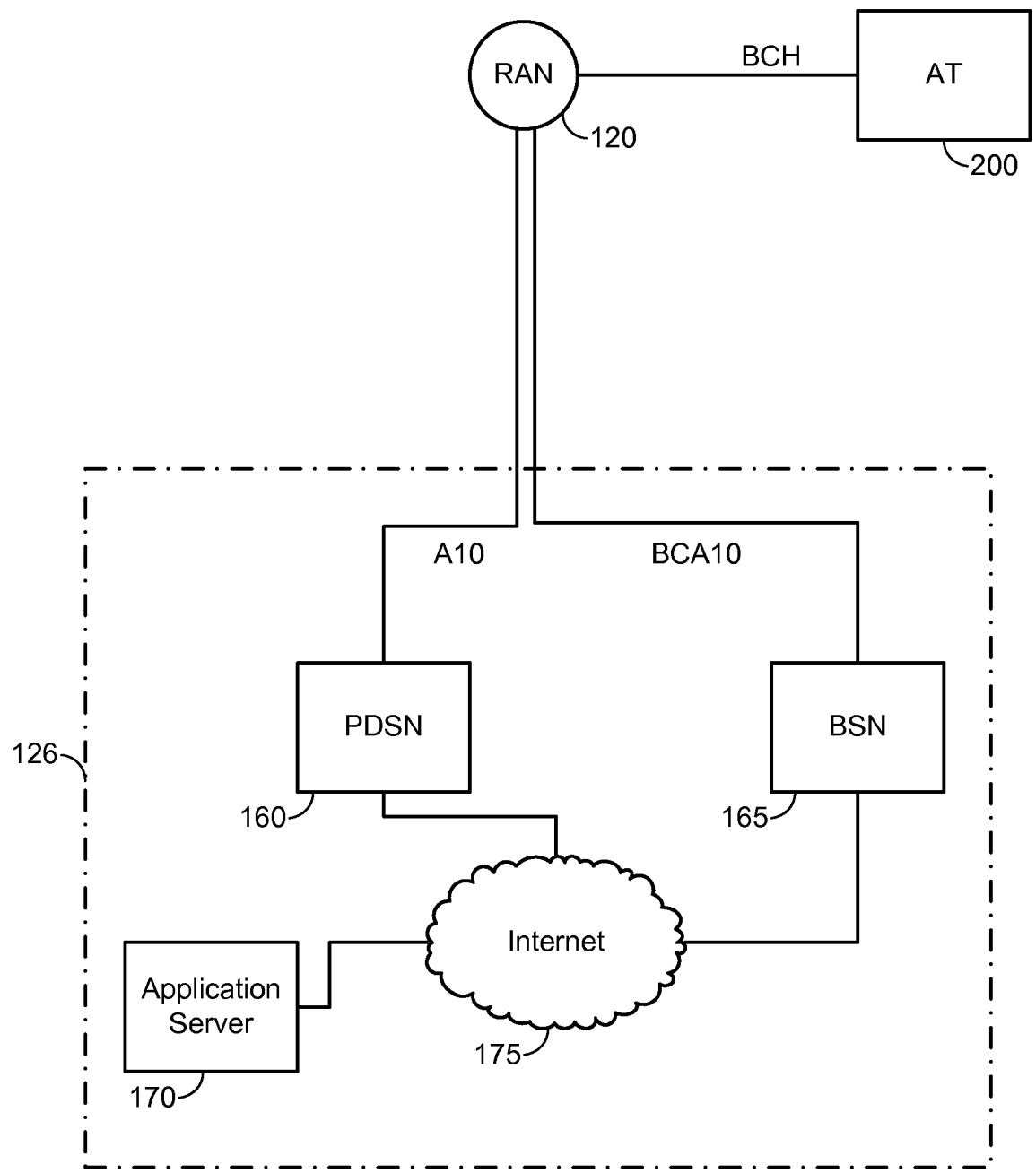
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
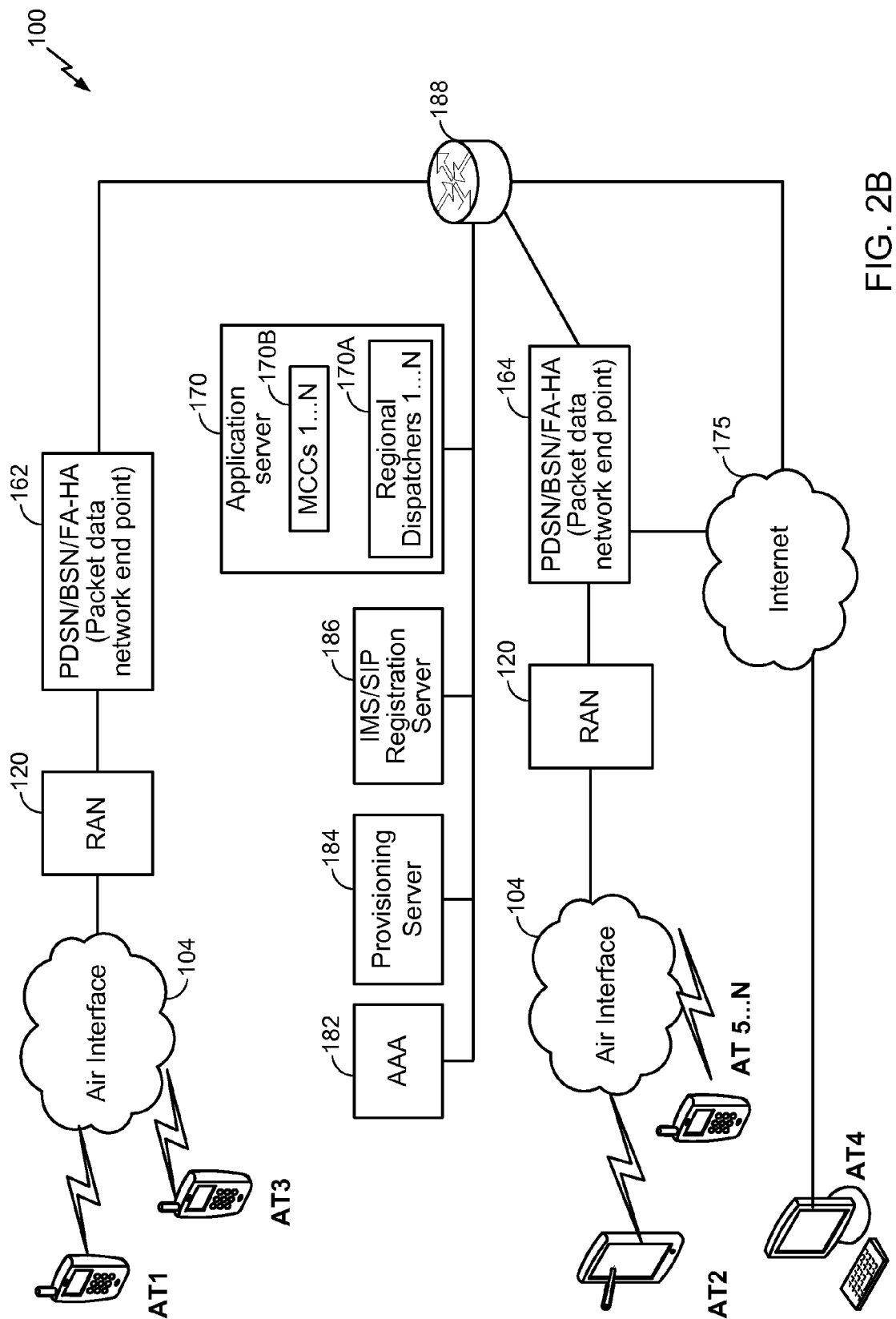
FIG. 2B illustrates an example of the wireless communication of FIG. 1 in more detail in accordance with at least one embodiment of the invention.

FIG. 2B illustrates an example of the wireless communication 100 of FIG. 1 in more detail. In particular, referring to FIG. 2B, ATs 1 . . . N are shown as connecting to the RAN 120 at locations serviced by different packet data network endpoints. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 . . . N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between ATs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the ATs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
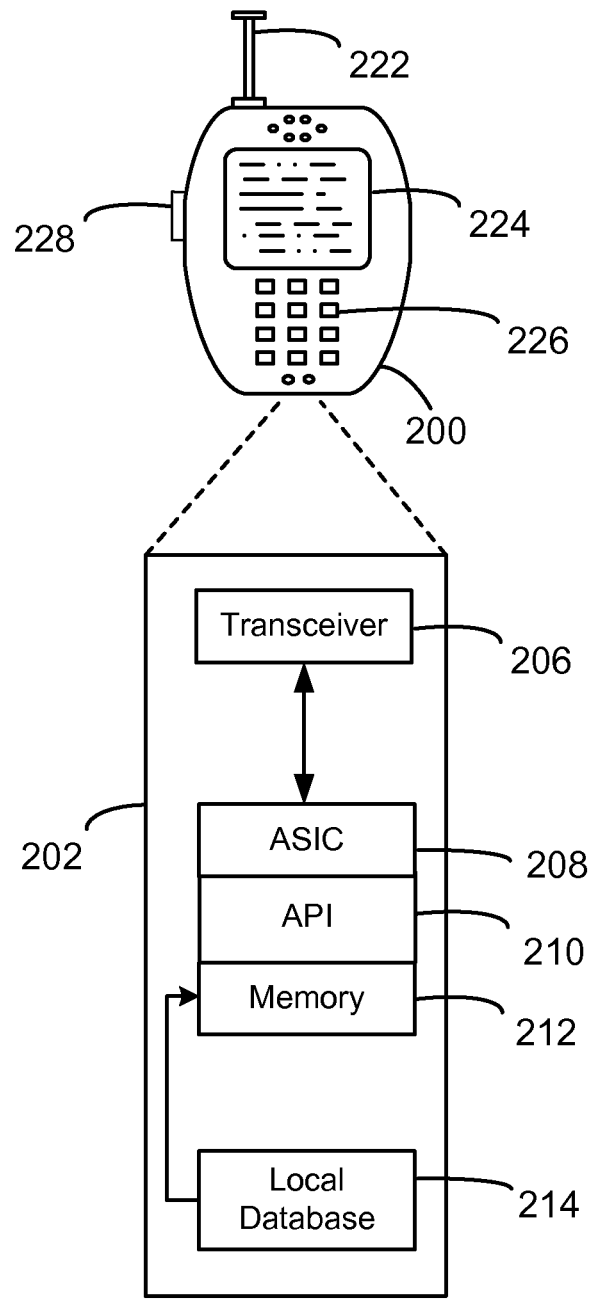
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

As discussed in the Background section, multicast messaging may be performed in a number of ways. In order to better understand embodiments of the present invention, a conventional multicast messaging process will be described with respect to FIGS. 4 and 5, respectively. Then, a multicast messaging process wherein a set of prospective sectors which are likely to include one or more multicast members is established before multicast session initiation will be described according to an embodiment of the present invention.

Figure 4:
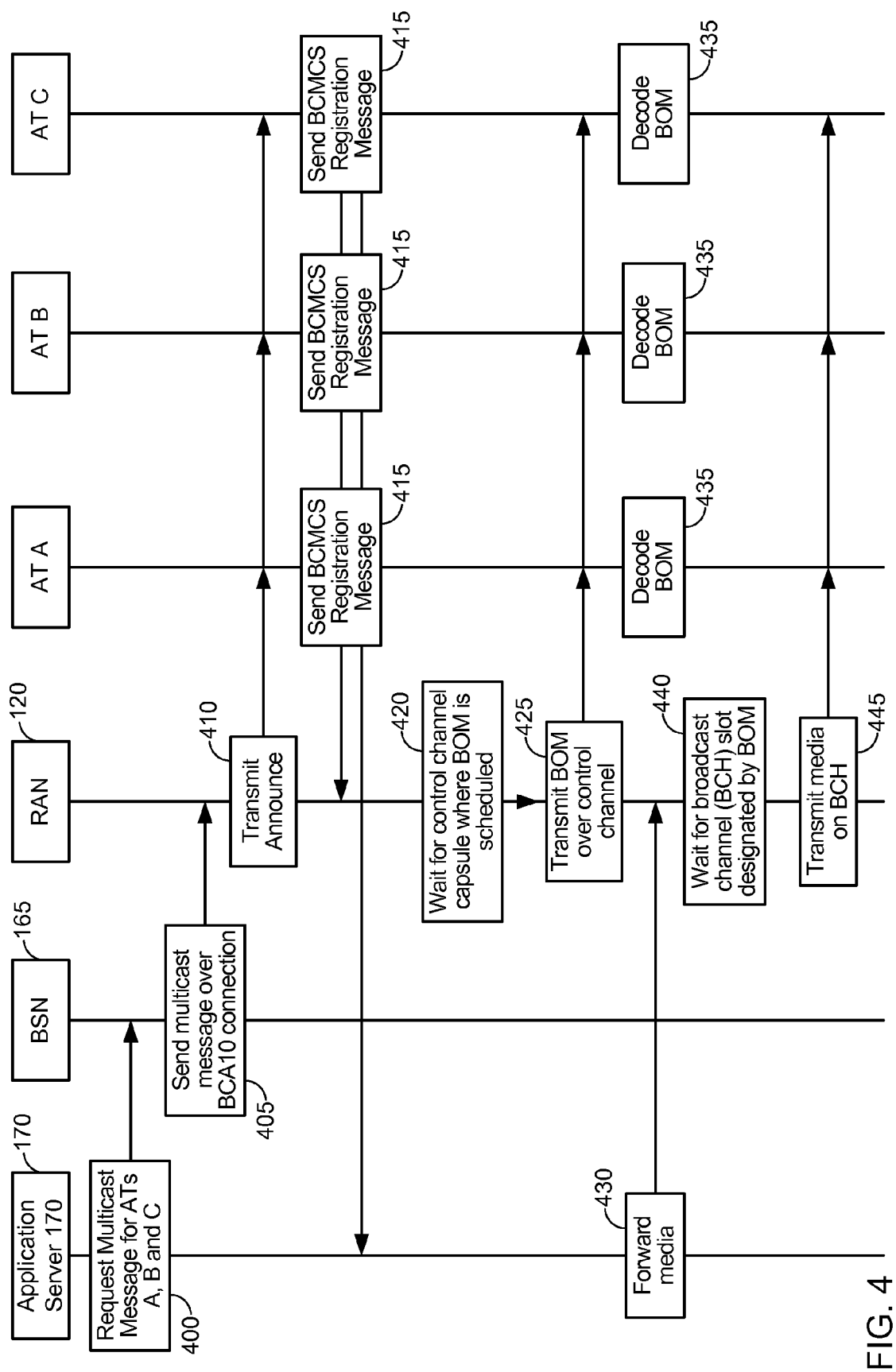
FIG. 4 illustrates a conventional multicast messaging process using a broadcast multicast service (BCMCS) framework.

FIG. 4 illustrates a conventional multicast messaging process using a broadcast multicast server (BCMCS) framework. It is noted that while FIG. 4 illustrates 'conventional' art as known to the inventors, FIG. 4 does not necessarily illustrate prior art, and as such no such admission is intended unless otherwise indicated. The multicast messaging process of FIG. 4 is described below as performed within the wireless system 100 of FIGS. 1 and 2. Referring to FIG. 4, in 400, the application server 170 (or other initiator) requests a multicast message to be sent to a multicast group including ATs (e.g., A, B and C). The multicast message from 400 is routed to the BSN 165. In 405, the BSN 165 forwards the multicast message over the BCA10 connection to the RAN 120. For example, the multicast message is first forwarded to the BSC/PCF 122, and the BSC/PCF 122 analyzes the multicast group members for the multicast message and forwards the multicast message to each MPT/BS 124 serving one or more multicast group members.

After receiving the forwarded multicast message, the RAN 120 waits for a next available control channel capsule in 410 and then transmits the announce message on a control channel (e.g., packaged within a data over signaling (DoS) message). For example, the control channel referred to herein is a downlink control channel which is assigned a timing than the broadcast channel (BCH) (e.g., in EV-DO, for example, the BCH and CCH are time-multiplexed such that each channel occupies different timeslots of a downlink frequency of the base station). Generally, less bandwidth (e.g., fewer timeslots) is allocated to the control channel, which is conventionally intended to include control messaging only, while more bandwidth (e.g., more timeslots) is allocated to the broadcast channel (BCH) which is conventionally intended to include data.

Figure 5:
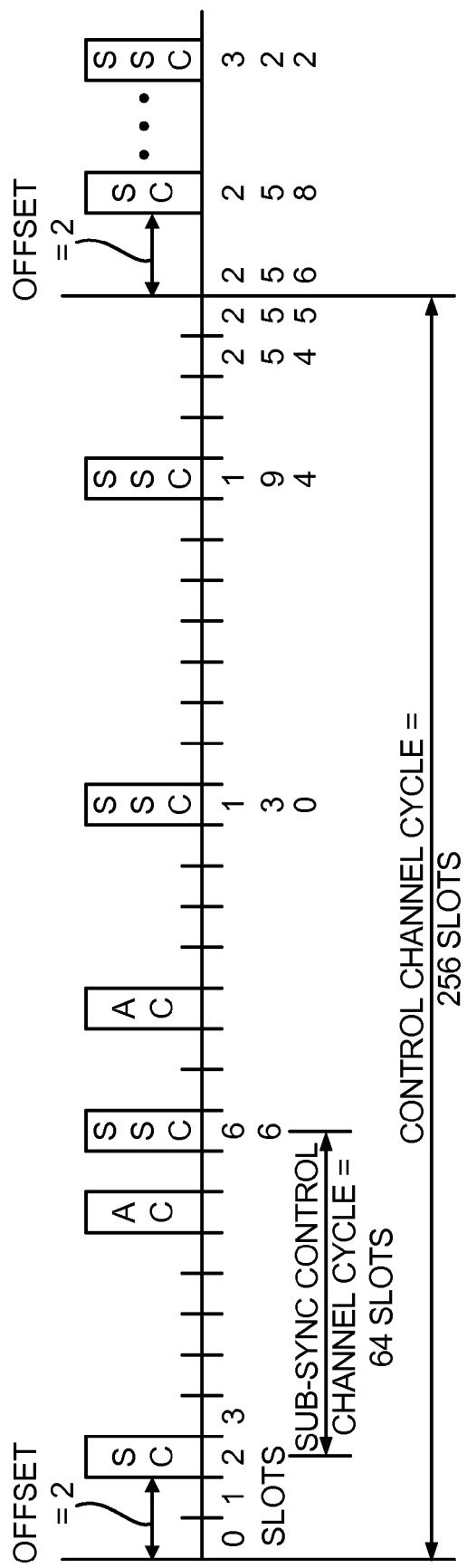
FIG. 5 illustrates a conventional cycle of a downlink control channel.

Referring to FIG. 5, each control channel cycle includes a total of 256 slots. Each control channel cycle includes a synchronous control channel capsule (SC), an asynchronous control channel capsule (AC), and a number of sub-synchronous control channels (SSCs). One SC is regularly or periodically transmitted at a given timeslot for each control channel cycle having a period of 256 slots, whereas the AC is transmitted at "random", or at non-synchronous timeslots, within the control channel cycle. The SC is first transmitted at a timeslot corresponding to "T mod 256=Offset", and then optionally retransmitted at a timeslot corresponding to "T mod 4=Offset", where T denotes a system time and an Offset denotes a time value delayed from a fixed time, which are included in the control channel header. Each SC may include a plurality of control channel MAC layer packets, whereas each AC includes only one control channel MAC layer packet. As each MPT/BS 124 periodically transmits one or more control channel MAC layer packets, interference (e.g., inter-cell interference) may occur if each MPT/BS 124 transmits at the same time. Accordingly, a different offset is applied to the SC for each MPT/BS 124 to avoid collisions. The MPT/BS may transmit as many as three SSC capsules within one control channel period or 256 slot cycle. Each SSC typically transmits only one control channel MAC layer packet. Assuming an offset value of 2, the SSCs are transmitted at time slots 66, 130 and 194. Control channel capsules (e.g., SCs, ACs, SSCs, etc.) are generally well-known in the art within BCMCS systems, and as such a further description thereof has been omitted for the sake of brevity.

Returning back to FIG. 4, upon receiving the announce message at ATs A, B and C, assume that each of ATs A, B and C determine to join the announced communication session and thereby each send BCMCSFlowRegistration messages to the RAN 120, 415, in order to register to the session with the RAN 120. Also in 415, ATs A, B and C send announce ACK messages to the RAN 120, which are forwarded to the application server 170. In 420, upon receiving the BCMCSFlowRegistration messages from ATs A, B and C, the RAN 120 may wait for either a synchronous control channel capsule (SC) (e.g., timeslot 2 in a next control channel cycle assuming an offset of 2) or, alternatively, a sub-synchronous control channel capsule (SSC) (e.g., one of timeslots 66, 130, 194 of the control channel cycle assuming an offset of 2), where the periodic BOM message is scheduled. For example, one particular control channel capsule within each control channel cycle may be reserved for a particular BOM since other applications may be attempting to access the control channel and other messages may be scheduled a delay of multiple cycles may be incurred.

In 425, after waiting for the next available SC or SSC, the RAN 120 transmits a broadcast overhead message (BOM) over the air interface to one or more multicast group members (e.g., ATs A, B, C) at least within sectors of the wireless communication system 100 that include ATs that send the BCMCSFlowRegistration messages in 415. The BOM is a forward link control message defined by EV-DO standards. The BOM is used to notify each multicast group member of the BCMCS flows which are currently being carried in a sector. The BOM also provides Interlace-Multiplex Pair (IM-Pair) information which is information regarding the forward link physical layer timeslots that should be decoded to receive the desired packet flows, and information on the number of physical layer slots per broadcast physical layer packet and physical layer rate used to transmit the flow. In 430, upon receiving a first announce ACK from ATs A, B or C, the application server 170 begins forwarding media to the RAN 120 for transmission to the target ATs. ATs A, B and C receive and decode the BOM, 435, and the RAN 120 waits a predetermined number of slots (e.g., 8 to 16 slots) after the transmission of the BOM from 425 for the BOM to be decoded at the target ATs. After the BOM-decoding delay, the RAN 120 waits for the BCH slot designated by the decoded BOM before sending the media to the target ATs that was received in 430, 440. This creates another delay, which may be further exacerbated based on the traffic on the broadcast channel (BCH). After the delay of 440, the RAN 120 can begin transmitting media on the BCH to the registered group members, 445. As described above with respect to FIG. 4, conventional BCMCS multicast messaging typically requires each target AT or multicast group member to decode a broadcast overhead message (BOM) before media is transmitted over a broadcast channel (BCH) to the respective members of the multicast group. This creates delays both for the scheduling of the BOM, and delays for the decoding of the BOM. Also, the announce message of 410 is transmitted in all possible sectors within the wireless communication system 100, because the location of the call targets is not known by the application server 170. It will be appreciated, however, that multicast group members are not necessarily present within each sector. Thus, a certain number of transmissions are wasted each time a multicast session is initiated.

Embodiments of the present invention will hereinafter be described wherein access terminals "pre-register" with the RAN 120 for future multicast sessions. Thereafter, the access terminals periodically update their location and/or their group membership information such that, upon initiation of a given multicast session, the RAN 120 has at least some knowledge regarding where the multicast group members for the given multicast session are located. Thus, the RAN 120 may reduce the number of transmissions required to establish and/or maintain the given multicast session.

Figure 6:
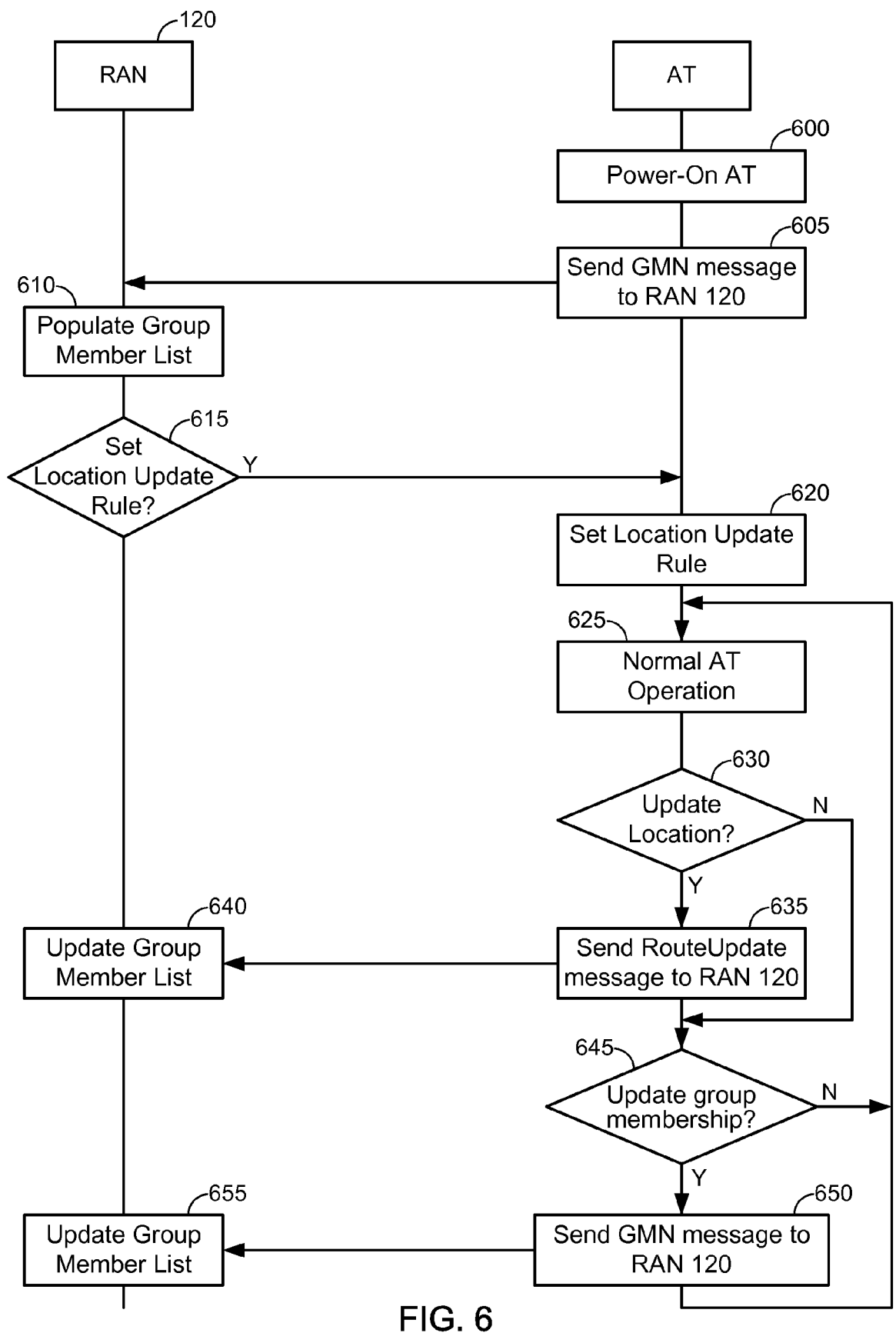
FIG. 6 illustrates group membership reporting and location update process according to an embodiment of the present invention.

FIG. 6 illustrates group membership reporting and location update process according to an embodiment of the present invention. In the embodiment of FIG. 6, in 600, a given AT desiring to belong to one or more multicast groups powers on. After the given AT powers up, the given AT sends a Group Membership Notification (GMN) message to the RAN 120 in 605 (e.g., after locating a pilot signal sent by one or more base stations within the RAN 120, and/or performing any other initial power-up procedures). The GMN message includes a list of the multicast groups to which the given AT is a current or prospective multicast group member.

In an example, the GMN message may be included within a standard BCMCSFlowRegistration message. The BCMCSFlowRegistration message is well-known in the art, and is defined within 1x EV-DO standards. Typically, an AT sends a BCMCSFlowRegistration message after receiving a BOM with a register set to prompt a BCMCSFlowRegistration message (e.g., a register for dynamic broadcast (RFDB) field or register for paging (RFP) field equal to 1). The BCMCSFlowRegistration message includes a list of BCMCSFlowIDs that an AT wishes to monitor. The BCMCSFlowIDs can be either dynamically assigned (e.g., by a BCMCS Controller (not shown)) or can be pre-configured. If the BCMCSFlowIDs are dynamically assigned by the BCMCS Controller, the AT can acquire the BCMCSFlowIDs via a BCMCS flow discovery process before sending the BCMCSFlowRegistration message. On the other hand, in another embodiment of the present invention, a certain block of BCMCSFlowIDs may be pre-configured to be reserved irrespective of whether a multicast session is actually active. In this example, each "reserved" BCMCSFlowID may be mapped to a respective IP Group ID (i.e., a multicast IP address and port number pair). In an example, the mapping of the "reserved" BCMCSFlowIDs is pre-configured at each multicast group member and at the RAN 120 and/or BSN 165, as discussed in greater detail within U.S. Provisional Patent Application No. 60/974,827, entitled "METHODS OF GENERATING MULTICAST FLOW IDENTIFIERS", filed on Sep. 24, 2007, assigned to the assignee hereof, and expressly incorporated by reference herein in its entirety. Accordingly, in this example, the BCMCSFlowIDs included within the GMN message of 605 may correspond to one or more of the "reserved" BCMCS-FlowIDs.

In an alternative example, the GMN message may be included within a proprietary or non-standard message, such as, for example, in a StorageBLOBNotification message on the uplink. In this example, the GMN message may include a list of BCMCSFlowIDs. Alternatively, the GMN message may include a list of multicast IP addresses and port numbers for the multicast sessions being requested.

While 600 and 605 of FIG. 6 are directed to AT "power-up", in an alternative embodiment, a supplemental GMN message may be sent to the RAN 120 each time the given AT hands off (e.g., to a new base station, a new sub-net, etc.).

The RAN 120 receives the GMN message, 605, and populates a group member list in 610. Each group member list entry includes (i) a list of ATs having sent GMN messages to the RAN 120 ("AT List Field"), (ii) the associated multicast groups for each AT within the group member list ("Multicast Group Field") (e.g., stored as a BCMCS flow ID entry of a BCMCSFlowID is reported in 605, stored as a multicast IP address and port number pair if a proprietary message is reported in 605, etc.), (iii) a last-known location for each AT ("Location Field") (e.g., indicating a sector identification, a base station identification, etc.) and (iv) a time-stamp indicating a time at which the last-known location of the AT was reported ("Time-Stamp Field"). An example of a group member list entry is provided below as Table 1:

TABLE 1

| AT List Field | AT 1 |
| Multicast Group Field | T_Flow, U_Flow, V_Flow |
| Location Field | Sector Y |
| Time-Stamp Field | 7:06 PM EST |

Thus, as shown in the example of Table 1, the given AT is labeled as "AT 1" and the given AT is a member of multicast groups T_Flow, U_Flow and V_Flow. The last-known location of the given AT is within Sector Y of the wireless communication system 100, and the last-known location was reported at 7:06 PM Eastern Standard Time (EST).

In another example, the group member list entries may be grouped based on the multicast group field, as provided below as Table 2:

TABLE 2

| Multicast Group Field | T_Flow |
| AT List Field | AT 1, AT 2, AT 3, AT 4 |

Thus, as shown in the example of Table 2, ATs 1 through 4 are registered for multicast group T_Flow. The location field and time-stamp field have not been included within Table 2 for convenience of illustration, as these fields are specific to each of ATs 1 through 4.

It will be appreciated that the group member list entries provided above have been given for example purposes only, and other embodiments of the present invention may configure the group member list entry in any well-known fashion.

For example, the Location Field may alternatively store a base station identifier, and not a sector identifier. In another example, the Location Field may store an identifier identifying a plurality of sectors, such as a location area (LA) identifier, where each LA corresponds to a portion of a subnet or PCF area (e.g., as defined by the RAN 120), or a multicast area (MA) identifier, where each MA corresponds to a portion of a subnet or PCF area identified by the RAN 120 solely for a multicasting purpose.

In 615, after updating the group member list based on the GMN message in 610, the RAN 120 determines whether to dynamically set a location update rule or protocol for the AT. The location update rule corresponds to the manner in which the AT schedules the transmission of RouteUpdate messages to the RAN 120. A RouteUpdate message updates Location Field and Time-Stamp Field (see above) for a particular AT. Generally, if the RAN 120 wishes to keep closer track of the locations of multicast group members for a particular multicast group, the RAN 120 may set a relatively aggressive location update rule in 615. Otherwise, if the RAN 120 wishes to reduce reverse link traffic, the RAN 120 may set a relatively conservative location update rule in 615. In another alternative example, the RAN 120 may set no location update rule, and may rely upon a default or manually entered location update rule at the given AT. Examples of location update rules are provided below.

In 620, the given AT establishes the location update rule. For example, if the RAN 120 determines not to dynamically set the location update rule in 615, a default location update rule may be established in 620. Alternatively, if the RAN 120 determines to dynamically set the location update rule in 615, the dynamically set location update rule is activated in 620. In another alternative example, the user of the given AT may manually select and enter a custom location update rule.

In an example, the location update rule may be a distance-based registration (DBR) protocol, such that the given AT sends a RouteUpdate message after traversing a given distance (e.g., based on which sector(s) the given AT has traversed, etc.). The given distance may be based on which base stations the given AT has been handed off to, which base stations the given AT has been monitoring while in an idle state, etc. The changes in location update rule in the distance-based registration protocol can be communicated to the AT via Generic Attribute Update Protocol (GAUP) in the EV-DO system. In another example, the location update rule may be to transmit a RouteUpdate message each time the given AT enters a new location area (LA), where each LA corresponds to a portion of a subnet or PCF area (e.g., as defined by the RAN 120).

In another example, the location update rule may correspond to any of a number of possible of location update strategies. For example, the location update rule may be timer-based, wherein the given AT maintains a timer with a predetermined or custom period and transmits a RouteUpdate message once for each timer period. In this example, lower timer periods corresponds to a more aggressive location update rule for maintaining more up-to-date location entries for the group member list. However, lower timer periods are also associated with higher levels of traffic on the reverse link.

After setting the location update rule in 620, the given AT resumes normal operation (e.g., enters idle mode, makes voice calls, etc.), 625. In 630, the given AT determines whether to update its location information with a RouteUpdate message based on the location update rule established in 620. If the location update rule requires a RouteUpdate message, the RouteUpdate message is sent to the RAN 120 in 635. In 640, the RAN 120 updates the group member list parameters based on the RouteUpdate message. For example, the RAN 120 updates the Location Field and Time-Stamp Field of the group member list for the given AT based on the RouteUpdate message. Otherwise, if the location update rule indicates that a RouteUpdate message need not be sent, the process advances to 645.

In 645, the given AT determines whether to update its group membership information with a supplemental GMN message. For example, if the given AT wishes to join a new multicast group, the given AT may determine to send a supplemental GMN message (i.e., including the BCMCSFlowID and/or multicast IP address and port number pair for the new multicast group). In another example, if the given AT wishes to cancel its membership to a multicast group that it has already registered for, the given AT may determine to send a supplemental GMN message (i.e., omitting the BCMCSFlowID and/or multicast IP address and port number pair for the canceled multicast group). In an example, each supplemental GMN message supersedes any previously send GMN message. If the given AT determines not to update its group membership information, the process returns to 625 and the given AT resumes normal operation. Otherwise, if the given AT determines to update its group membership information, the given AT sends the supplemental GMN message in 650.

In 655, the RAN 120 updates the group member list parameters based on the supplemental GMN message. If the supplemental GMN message requests different multicast groups than the previously sent GMN message, the Multicast Group Field, which maintains a list of multicast groups to which the given AT belongs, is updated to add the multicast groups listed in the supplemental GMN message. Alternatively, the Multicast Group Field is updated to remove the multicast groups listed in the supplemental GMN message if group removal is indicated within the GMN message. As will be appreciated, this may necessitate removing previously listed multicast groups, adding new multicast groups and/or both adding and removing certain multicast groups from the associated multicast group field for the given AT. Further, the RAN 120 updates the Location Field and Time-Stamp Field of the group member list for the given AT sending the supplemental GMN message.

In another example, if the supplemental GMN message includes no listed multicast groups, the supplemental GMN message is interpreted as a request to drop or cancel the given AT from the group member list entirely. Accordingly, if the supplemental GMN message includes no multicast groups, the RAN 120 removes each of the AT List Field, the Multicast Group Field, the Location Field and the Time-Stamp Field for the given AT.

As will be appreciated in view of the above-description of FIG. 6, at any given time, the group member list includes information regarding where multicast group members are "potentially" located before an active multicast session for the multicast group is actually initiated (e.g., "potentially" because the group member list may not necessarily be perfectly accurate).

Further, while not illustrated in FIG. 6 explicitly, the RAN 120 may periodically update the group member list on its own initiative (i.e., not in response to RouteUpdate messages and/or GMN messages received from one or more ATs). For example, if a Location Field for a particular AT becomes "stale", or exceeds an age threshold, the RAN 120 may interpret the stale Location Field as not being up-to-date, and may remove the associated AT from the group member list entirely.

Figure 7:
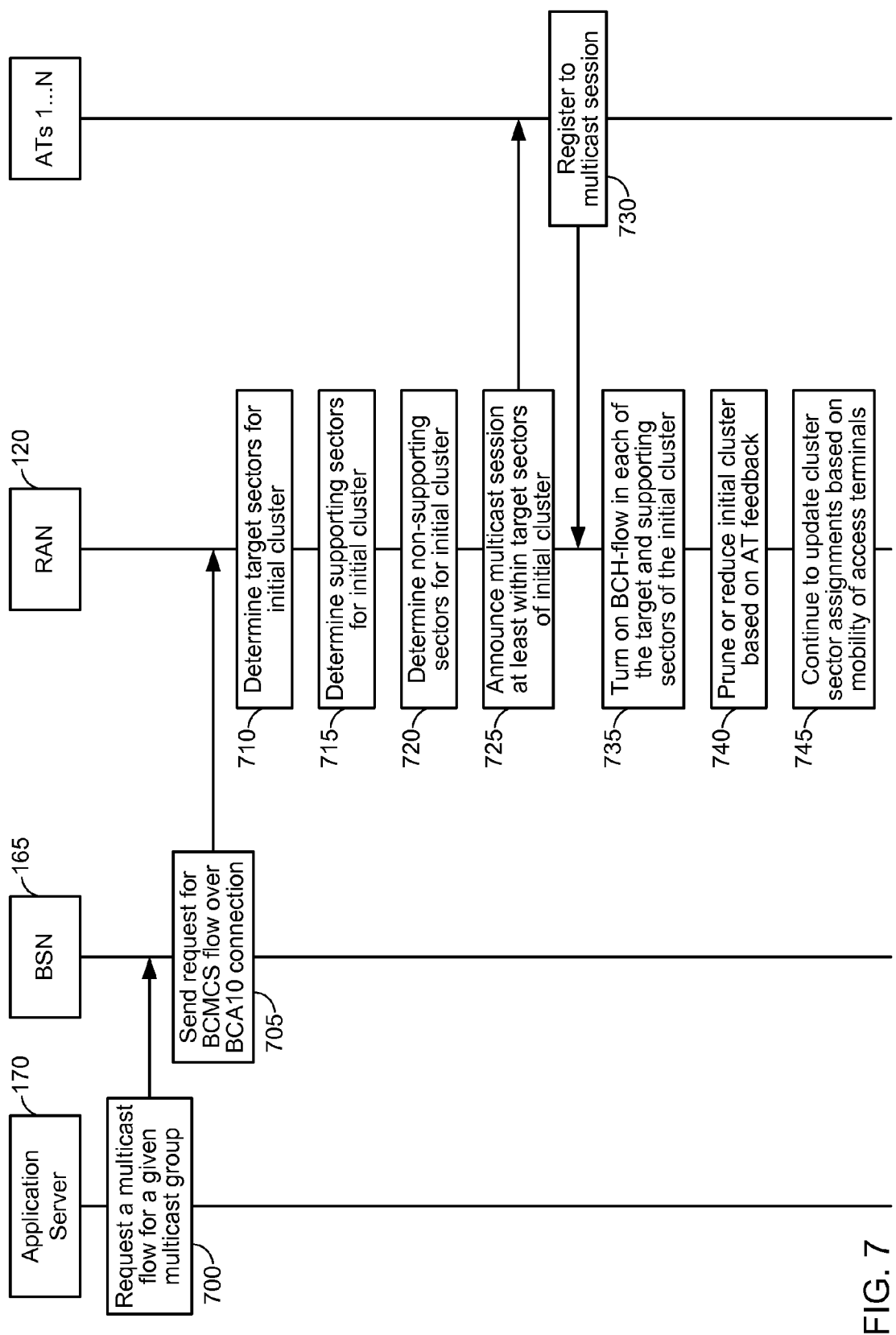
FIG. 7 illustrates a process of setting up a multicast communication session in accordance with an embodiment of the invention.

FIG. 7 illustrates a multicast messaging process according to an embodiment of the present invention. With regard to FIG. 7, assume that the group member list maintained by the RAN 120 includes a plurality of ATs that have registered with both the RAN 120 and the application server 170 for multicast group T_Flow, and also assume that the multicast group T_Flow is not currently engaged in a multicast communication session. Accordingly, as an example, the group member list for ATs having registered for T_Flow may include the following entries in Table 3 (below):

TABLE 3

| AT List Field | AT A | AT B | AT C | AT D | AT E | AT F | AT G |
|---|---|---|---|---|---|---|---|
| Multicast Group Field | T_Flow | T_Flow | T_Flow | T_Flow | T_Flow | T_Flow | T_Flow |
| Location Field | T1 | T1 | T2 | T3 | T3 | T4 | T4 |
| Time-Stamp Field (EST) | 4:05 PM | 4:08 PM | 4:07 PM | 3:03 PM | 3:23 PM | 3:38 PM | 3:44 PM |

Referring to FIG. 7, in 700, the application server 170 issues a request to initiate a multicast flow for a given multicast group. For purposes of example, assume the multicast flow corresponds to T_Flow, as in the Multicast Group Field for each of ATs A through G as in Table 3 (above). For example, the multicast flow T_Flow generated in 700 of FIG. 7 may be responsive to a given access terminal's request to speak to the given multicast group (not shown). After the application server 170 decides to accept the AT's request, the server 170 can generate a multicast flow announcement message to be sent to the group members via IP multicasting. The application server 170 forwards the multicast flow to the BSN 165 in 705, and the BSN 165 forwards the BCMCS flow over the BCA10 connection to the RAN 120, which is responsible for transmitting the multicast messages of the BCMCS flow to the multicast group members via the air interface 104 in one or more sectors, in 710.

In 710 of FIG. 7, the RAN 120 determines a set of target sectors for an initial "cluster". As used herein, a target sector is any sector within a wireless communication system having or "potentially" having at least one multicast group member. As used herein, a "cluster" corresponds to a set of sectors (e.g., one or more sectors) upon which the BCH carries the BCMCS flow for a particular multicast group. As will be described below in greater detail, the cluster includes both target sectors and supporting sectors for a particular multicast group or BCMCS flow.

Still referring to 710 of FIG. 7, the RAN 120 determines the set of target sectors for the initial cluster based on the group member list maintained at the RAN 120 (e.g., see Table 3). Accordingly, in the example of Table 3, the initial set of target sectors may correspond to sectors T1 through T4. More generally, the initial set of target sectors may correspond to all sectors that satisfy a certain proximity metric with respect to any of sectors T1 through T4 (e.g., because the last-known location for an AT maintained at the RAN 120 within a group member list entry is not necessarily correct, but is likely to be proximate to the AT's actual current location if the time-stamp field is relatively recent).

Next, in 715 of FIG. 7, the RAN 120 determines a set of supporting sectors for the initial cluster for the BCMCS flow T_Flow. In an example, the set of supporting sectors may be based on the set of target sectors determined in 710. For example, the supporting sectors may correspond to any sector adjacent to one or more target sectors which itself is not a target sector. Alternatively, a supporting sector may correspond to a sector in a given proximity (e.g., a distance proximity, a signal strength proximity, etc.) to a target sector without actually being adjacent to the target sector. While the RAN 120 determines the target and supporting sectors for the initial cluster in 710, at this point the initial cluster does not yet carry the BCH-flow (i.e., the multicast messages intended for group-members belonging to T_Flow) on the downlink BCH.

In 720 of FIG. 7, the RAN 120 determines an initial set of non-supporting sectors for the BCMCS flow. The initial set of non-supporting sectors for the BCMCS flow includes any sector within the wireless system 100 which is neither a target sector as determined in 710 of FIG. 7 nor a supporting sector as determined in 715 of FIG. 7. Non-supporting sectors are not considered to be part of a cluster, such that when reference is made to sectors belonging to a particular cluster, the sectors being referred to the target and/or supporting sectors of the cluster.

Figure 8A:
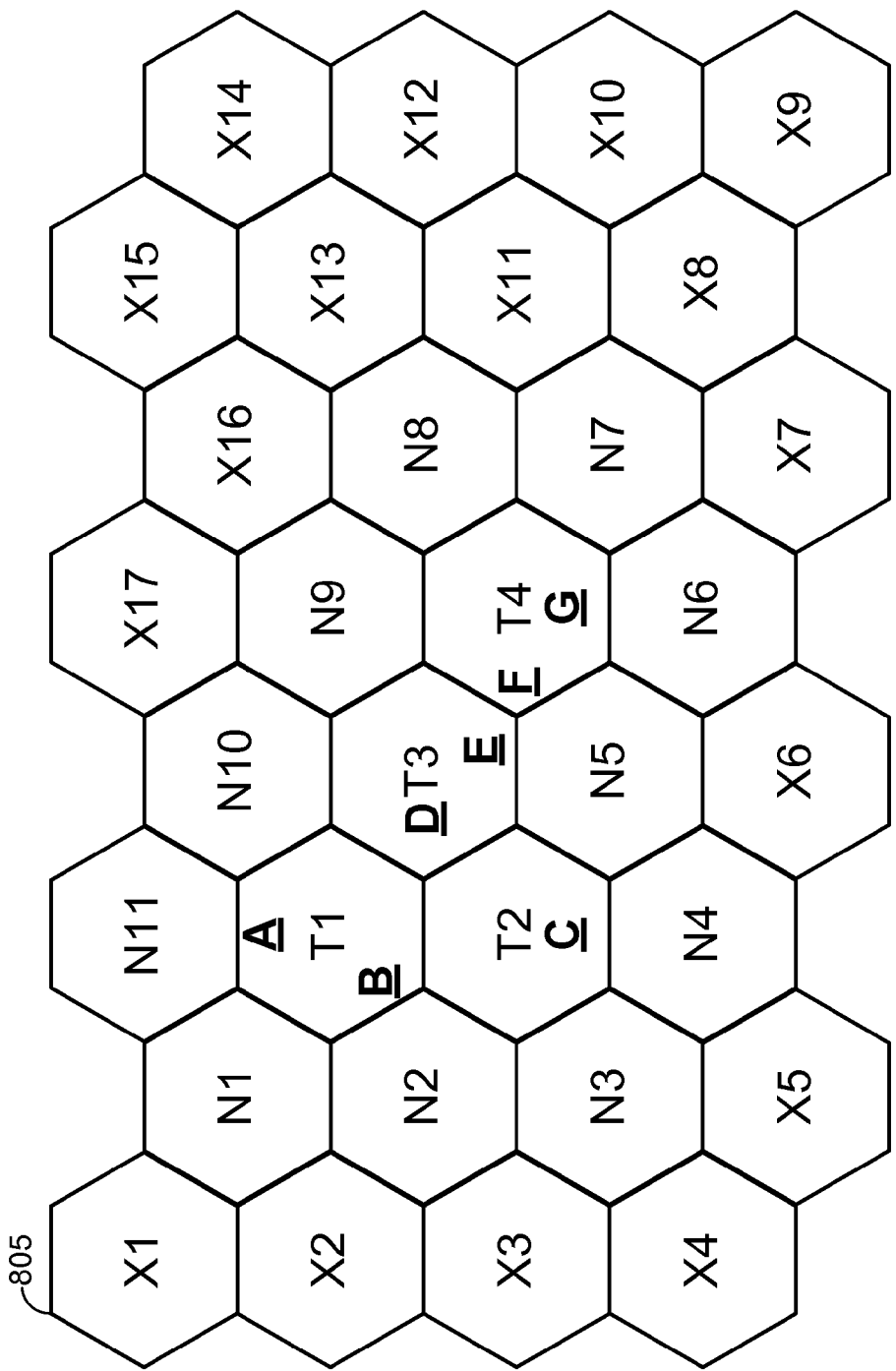
FIG. 8A illustrates an example of the initial cluster as established during the process of FIG. 7 in accordance with an embodiment of the invention.

In 725 of FIG. 7, the RAN 120 announces the multicast communication session for T_Flow at least within the target sectors of the initial cluster. FIG. 8A illustrates an example of the initial cluster as established between 710 and 720 and within which the announce message is transmitted in 720. As shown in 720, the initial cluster includes target sectors T1-T4 and supporting sectors N1-N11. For example, within the initial cluster, the announce message may packaged within a data over signaling (DoS) message and transmitted on a downlink control channel (CCH) to more quickly communicate the announce message to ATs within the initial cluster ("ATs 1 . . . N"), whereas the announce message may be sent to ATs outside of the initial cluster with a slower standard-paging technique to reduce loading on the CCH across the system 100.

After transmitting the announce message in 725 at least within the initial cluster, the RAN 120 waits to receive one or more BCMCSFlowRegistration messages from ATs 1 . . . N. In 730, assume that a first of ATs 1 . . . N sends a BCMCS-FlowRegistration message to the RAN 120 in order to register to the announced multicast session. After receiving a first BCMCSFlowRegistration message within the initial cluster in 730, the RAN 120 turns on the BCH-flow, 735, in each of the target and supporting sectors for the initial cluster as determined in 710 and 715, respectively. Thus, even though only one sector within the initial cluster is truly a target sector at this point because the BCMCSFlowRegistration message is received from only one of ATs 1 . . . N in 730, the RAN 120 carries the BCH-flow within any additional sectors of the initial cluster that would not otherwise qualify as target or supporting sector based on the registration(s) received in 730. Thus, the set of sectors carrying the BCH-flow is based on the RouteUpdate messages from the ATs and the corresponding data stored in the Group Member List at the RAN 120, and not based on the BCMCSFlowRegistration messages. In other words, the RAN 120 need not wait for BCMCSFlowRegistration messages within sectors that are expected to include target ATs based on earlier RouteUpdate messages before turning on the multicast flow in those sectors, and at the same time less than all of the sectors in the system 100 need carry the multicast flow preemptively in this manner. As will be appreciated, this may reduce setup times for ATs that are within the initial cluster but have not yet sent BCMCSFlowRegistration messages. However, this also reduces the forward link capacity of the system 100 because the BCH-flow is potentially carried in sectors that do not require the BCH-flow.

After turning on the BCH-flow in the initial cluster, the RAN 120 executes target sector and supporting sector processes at the respective target and supporting sectors. Generally, each target sector and each supporting sector carries the BCMCS flow on a downlink broadcast channel BCH, and as such the RAN 120 forwards the multicast message to base stations serving target sectors T1 through T4 and the supporting sectors. However, in order to reduce excessive AT feedback, supporting sectors transmit BOMs configured to prompt AT feedback (e.g., with RFDB=1 or RFP=1) at each BOM period (e.g., to prompt feedback from an AT "wandering" into a supporting sector), whereas target sectors send BOMs to prompt AT feedback less frequently, and more frequently send BOMs to suppress AT feedback (e.g., with RFDB=0 or RFP=0) (e.g., to discourage AT registration when the target sector already carries the BCMCS flow). Non-supporting sectors do not carry the BCMCS flow T_Flow, and the RAN 120 need not forward multicast messages for T_Flow to non-supporting sectors. A more detailed discussion of target sector behavior, supporting sector behavior and non-supporting sector behavior may be found U.S. Provisional Patent Application No. 60/974,808, entitled "METHODS OF SUPPORTING MULTICAST COMMUNICATIONS ASSOCIATED WITH OVERLAPPING CLUSTERS WITHIN A WIRELESS COMMUNICATIONS NETWORK", filed on Sep. 24, 2007, assigned by the assignee hereof, and expressly incorporated by reference herein in its entirety.

As will be appreciated, if the initial cluster over-estimated the number of sectors for which the BCH-flow is required for supporting the multicast communication session, a certain number of target sectors will eventually attempt to confirm whether one or more target ATs are being served within their respective sector (e.g., by setting a BOM with RFDB=1). When this happens, these target sectors will discover that no target ATs are actually within their sector. Accordingly, in 740, it will be appreciated that the initial cluster is 'pruned' or reduced based on AT feedback (e.g., in this case, the AT feedback is the lack of a BCMCSFlowRegistration message after a BOM with RFDB=1).

Figure 8B:
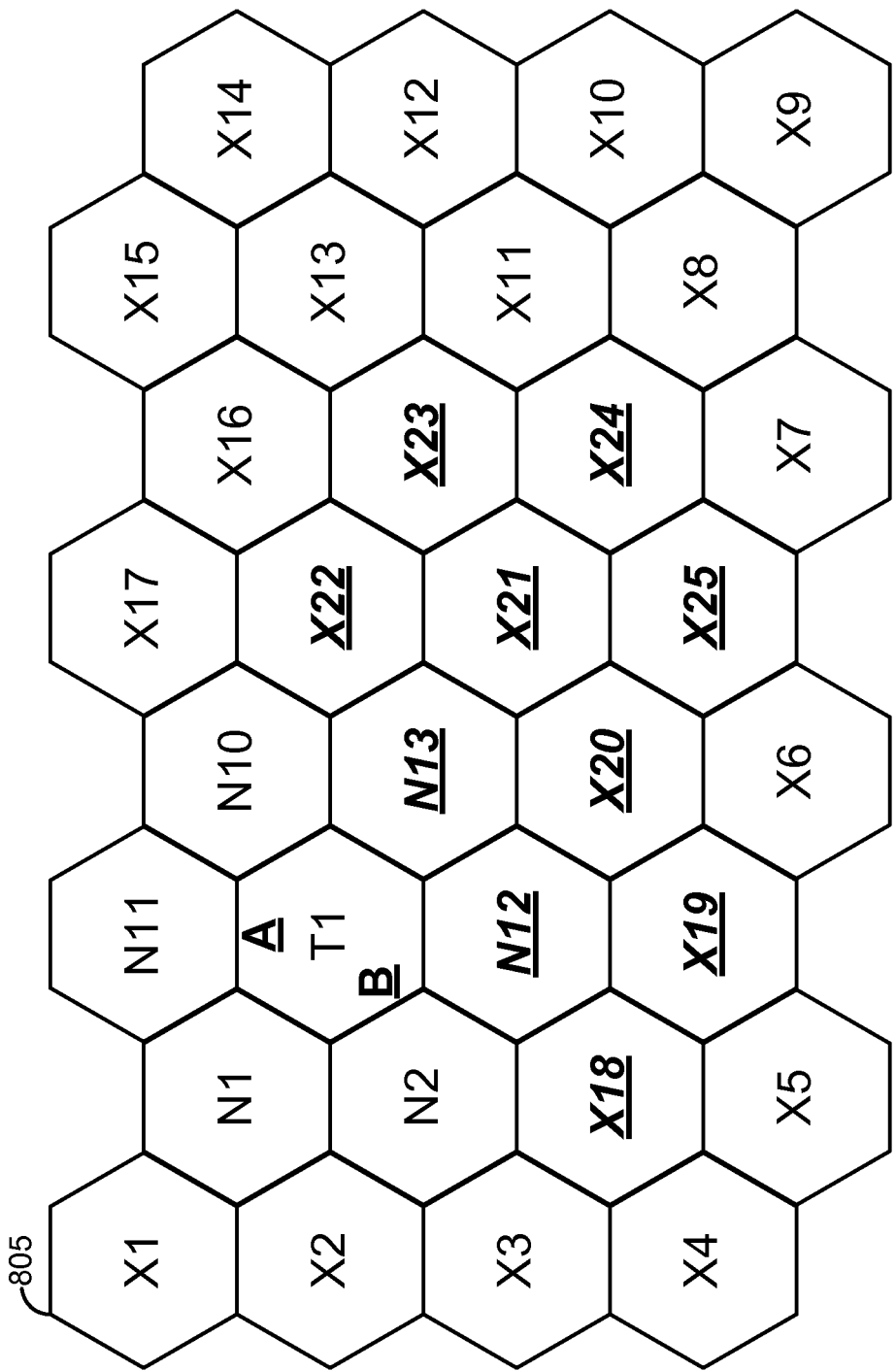
FIG. 8B illustrates a reduced or pruned version of the initial cluster of FIG. 8B.

In an example, as noted above, FIG. 8A illustrates an example of the initial cluster as established between 710 and 720 of FIG. 7. Next, in 730, assume that BCMCSFlowRegistration messages are only received within target sector T1, from target AT A and/or target AT B. Accordingly, ATs C . . . G do not send BCMCSFlowRegistration messages in response to the announce message of 725, despite having previously registered to the multicast group T_Flow and having updated their location in the Group Member List maintained at the RAN 120. In this case, the 'pruned' cluster may be illustrated as in FIG. 8B. In FIG. 8B, target sectors T2-T4 are transitioned to either supporting sectors or non-supporting sectors, and any supporting sectors of T2-T4 are transitioned to non-supporting sectors. The only sectors among previous target sectors T2-T4 and their supporting sectors that remain as supporting sectors after the pruning-step are sectors that are supporting sectors of T1, in this example.

Next, in 745 of FIG. 7, the RAN 120 updates the sector assignments of the pruned cluster (e.g., adds new target/supporting sectors, removes target/supporting sectors, etc.) during the multicast communication session. Again, a more detailed description of the sector assignment updates is provided within the above-referenced co-pending application. Also, while not explicitly shown in FIG. 7, it will be appreciated that, during the active multicast session, the RAN 120 continues to maintain/update the group member list based on GMN messages and RouteUpdate messages received from multicast group members.

In an alternative embodiment of the present invention, as discussed above with respect to 710 of FIG. 7, the target sectors may be configured to include (i) sectors stored in the last known location field of each AT maintained in Table 3 (i.e., sectors T1 through T4 (ii) and sectors satisfying a given proximity metric with respect to (i). For example, if the given proximity metric corresponds to adjacent sectors, then the wireless communication system 800A would be modified such that the supporting sectors N1 through N11 would also be initial target sectors, sectors adjacent to the new set of target sectors would be supporting sectors, and so on. As another example, if the given proximity metric corresponds to all sectors within the distance from the last registered sector for conducting distance-based registration, all sectors within the distance would also be target sectors. Accordingly, it will be appreciated that the initial target sector group of the initial cluster 800A is not necessarily limited to the last-known locations of ATs as maintained at the RAN 120 for a given multicast group.

In another example, the group member list may be used to provide scheduling instructions, from the RAN 120 to multicast group members, that instruct the multicast group members with regard to how to respond to "interactive" multicast messages, such as announce messages, where an interactive multicast message is a multicast message that requests or requires feedback from one or more multicast group members. For example, if a large number of multicast group members are expected to be present within a particular sector, and an announce message for a multicast session is sent within the sector, a relatively large number of multicast group members may attempt to access the reverse link channel at the same time to respond to the announce message and register for the multicast session. However, with information present within the group member list, the RAN 120 can schedule a response sequence for the access terminals to respond to the announce message via an "access control message" (ACM) (e.g., the ACM corresponds to any downlink control message from the RAN 120 with instructions with regard to how individuals ATs are to contend for the reverse link access channel). For example, the RAN 120 may send the ACM along with the announce message, with the ACM designating a prioritized response order that reserves feedback slots for a number of access terminals based on the group member list. For example, the access terminal with the most recent update to its Location Field (e.g., updated via a GMN message, a RouteUpdate message, etc.) at the group member list maintained by the RAN 120 may be granted the first response slot by the ACM, the AT having the next most recent updated Location Field may be granted the second response slot by the ACM, and so on. ACMs and scheduling of interactive multicast message feedback on the reverse link are discussed in more detail within U.S. Provisional Patent Application No. 60/974, 796, entitled "METHODS OF RESPONDING TO AN INTERACTIVE MULTICAST MESSAGE WITHIN A WIRELESS COMMUNICATION SYSTEM", filed on Sep. 24, 2007, assigned by the assignee hereof, and expressly incorporated by reference herein in its entirety.

As discussed above with respect to FIGS. 7, 8A and 8B, an initial cluster is established based in part upon expected locations of ATs stored in a Group Member List at the RAN 120 for a particular multicast group, and each target sector and supporting sector of the entire initial cluster carries the BCH-flow for the group session after a first BCMCSFlowRegistration message is received at the RAN 120 from any target AT within any sector of the initial cluster. As will be appreciated by one of ordinary skill in the art, providing the BCH-flow in each sector of the initial cluster may cause the forward capacity of the system 100 to be reduced more than necessary if less than all sectors of the initial cluster are actually required to provide the BCH-flow for the target ATs contained therein. Below, embodiments of the invention are described by which the initial cluster is used to determine where the multicast session is to be announced (e.g., in a DoS message on the CCH, etc.), but the BCH-flow is only carried based on where actual registration requests from target ATs are received (e.g., FIG. 9A) or based on a temporally-relevant cluster formation at the end of a previous multicast session for the group (e.g., FIG. 9B).

Figure 9A:
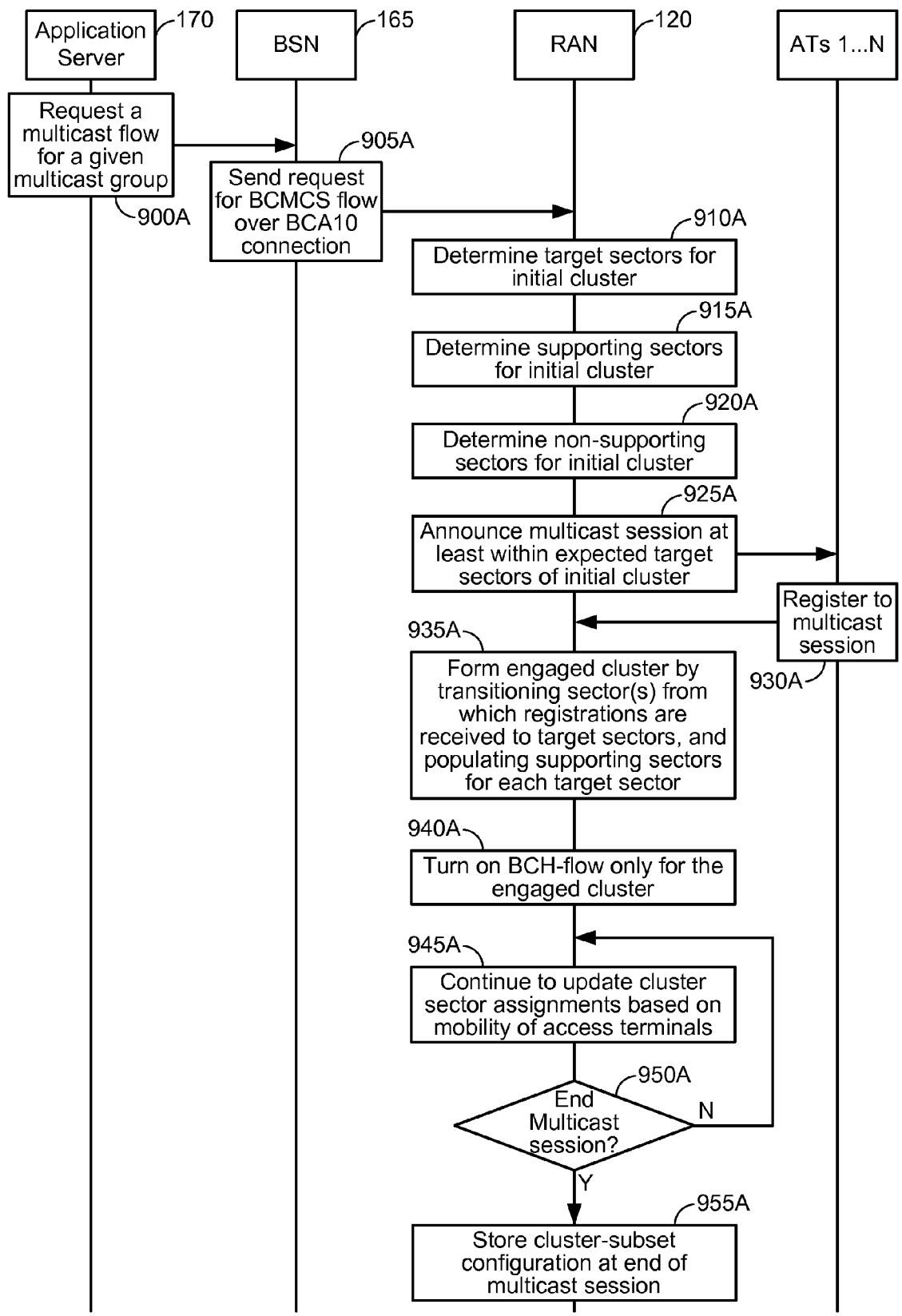
FIG. 9A illustrates a process of setting up a multicast communication session in accordance with an embodiment of the invention.

FIG. 9A illustrates a multicast messaging process according to another embodiment of the present invention. In particular, FIG. 9A illustrates an alternative embodiment for supporting either a first session involving a particular multicast group, or a subsequent session begins at least a threshold period of time after a previous session. For example, if the threshold of time is two (2) hours, and the most recent session involving the multicast group is four (4) hours before the current session, then the process of FIG. 9A may execute even though there was a previous multicast session. It is also at least possible that the time threshold can be set so low that the process of FIG. 9A is used even when there was another session involving the multicast group only a short time before the new session is initiated.

With regard to FIG. 9A, as in FIG. 7, assume that the group member list maintained by the RAN 120 includes a plurality of ATs that have registered with both the RAN 120 and the application server 170 for multicast group T_Flow, and also assume that the multicast group T_Flow is not currently engaged in a multicast communication session. Accordingly, as an example, the group member list for ATs having registered for T_Flow may include the entries in Table 3 (above).

Referring to FIG. 9A, blocks 900A through 930A correspond to blocks 700 through 730 of FIG. 7, respectively. Accordingly, the sectors of the initial cluster are determined (910A, 915A, 920A), the RAN 120 announces the multicast communication session at least within target sectors of the initial cluster (925A), and at least one target AT within the initial cluster accepts the call announcement and requests registration to the announced multicast session (930A).

At this point, in FIG. 7, the RAN 120 simply turned on the BCH-flow within the initial cluster, which essentially means that the initial cluster is 'activated' such that each sector determined as a target sector or a supporting sector in 710 and 715, respectively, is transitioned to either a target sector or a supporting sector. In FIG. 9A, however, upon receiving registrations from individual target ATs within sectors of the initial cluster in 930A, the RAN 120 transitions only the sectors from which registrations have been received into target sectors in 935A, and then populates the supporting sectors associated with these target sectors. The resultant group of target and supporting sectors may collectively be referred to as an 'engaged cluster'. Accordingly, the engaged cluster formed in 935A corresponds to a subset (e.g., less than or equal to) of the initial cluster where the multicast session was announced in 925A.

Figure 10A:
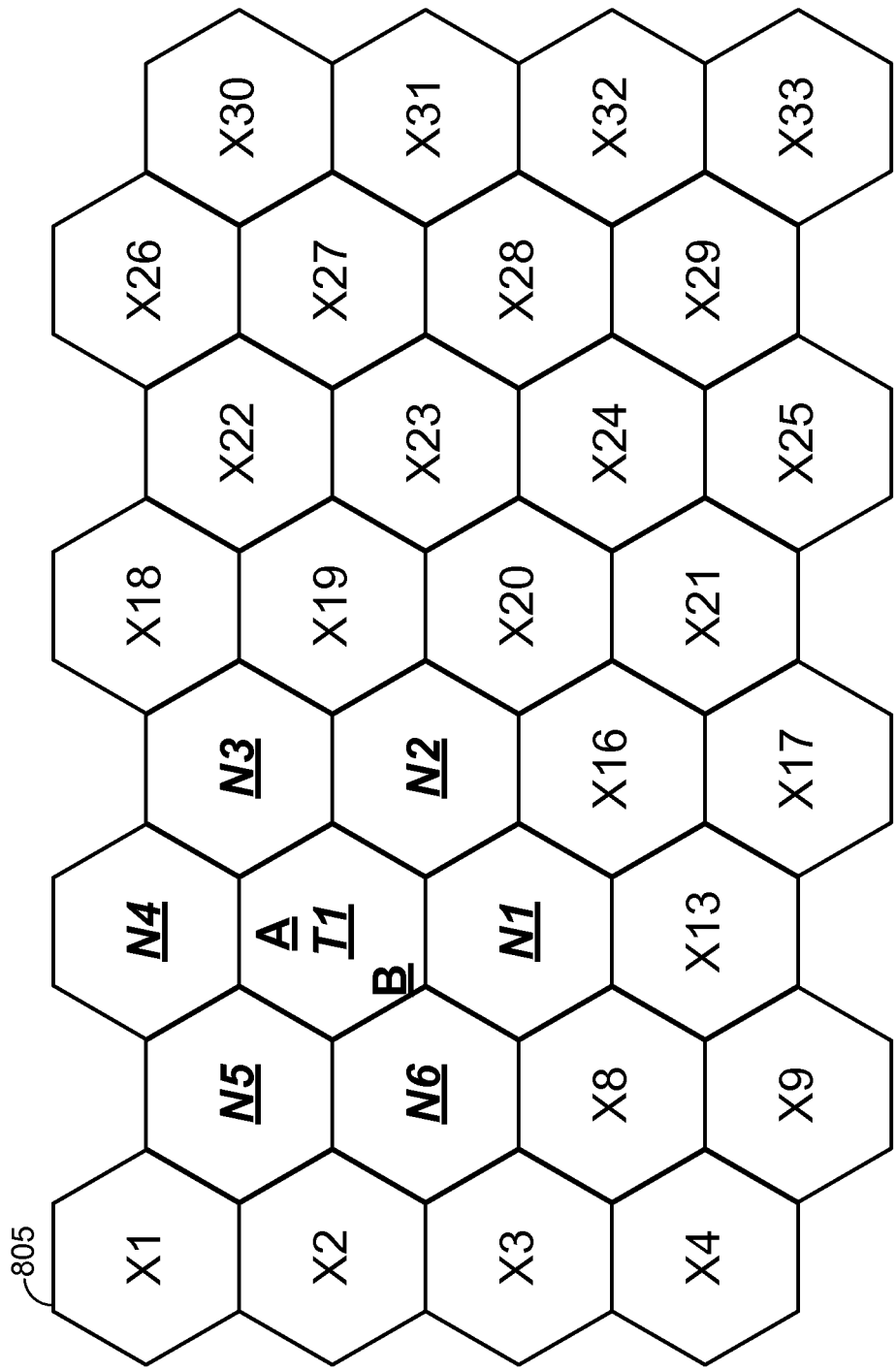
FIG. 10A illustrates an example of an engaged cluster as established during the process of FIG. 9A in accordance with an embodiment of the invention.

For example, assume that the initial cluster is formed as illustrated in FIG. 8A, such that block 910A determines sectors T1-T4 as target sectors and block 915A determine sectors N1-N11 as supporting sectors. In this case, the announcement of 925A announces the multicast session at least within sectors T1-T4 and N1-N11. However, in FIG. 9A, the initial cluster is not directly used with regard to where the BCH-flow is carried. Accordingly, assume that only one or more target AT(s) within sector T1 actually sends a BCMCSFlowRegistration message within a threshold period of time in response to the announce message in 930A. In this case, the engaged cluster may be formed as in FIG. 10A, such that sector T1 from the initial cluster transitions to a target sector T1 in the engaged cluster, and sectors N1, N2, T2, T3, N10 and N11 from the initial sector transition to supporting sectors N1-N6, respectively, in the engaged cluster. In this case, because the engaged cluster essentially starts as a "blank slate", the additional supporting and target sectors from the initial cluster need not be actively transitioned to non-supporting sectors in the engaged cluster because the engaged cluster sets sectors, as a default, to non-supporting sectors until registration messages are received from target ATs during 930A.

Next, upon forming the engaged cluster in 935A, the RAN 120 turns on the BCH-flow for the multicast communication session within the engaged cluster and does not turn on the BCH-flow within sectors that belong to the initial cluster but do not belong to the engaged cluster (if any), 940A. After turning on the BCH-flow in the engaged cluster, the RAN 120 executes target sector and supporting sector processes at the respective target and supporting sectors of the engaged cluster. Generally, each target sector and each supporting sector of the engaged cluster carries the BCMCS flow on a downlink broadcast channel BCH, and as such the RAN 120 forwards the multicast message to base stations serving target sector T1 and the supporting sectors N1-N6.

As will be appreciated, even if the initial cluster overestimated the number of sectors for which the BCH-flow is required for supporting the multicast communication session, the engaged cluster relies upon actual registration messages from target ATs for its formation, and as such carrying the multicast flow in the engaged cluster does not unduly load the forward link of the RAN 120. Also, the engaged cluster need not be 'pruned' or reduced as in 740 of FIG. 7, although it will be appreciated that during the multicast session target ATs may move or drop the call, such that the target and supporting sector configuration of the engaged cluster can still change after its formation.

Next, in 945A of FIG. 9A, the RAN 120 updates the sector assignments of the engaged cluster (e.g., adds new target/supporting sectors, removes target/supporting sectors, etc.) during the multicast communication session. Again, a more detailed description of the sector assignment updates is provided within the above-referenced co-pending application. Also, while not explicitly shown in FIG. 9A, it will be appreciated that, during the active multicast session, the RAN 120 continues to maintain/update the group member list based on GMN messages and RouteUpdate messages received from multicast group members.

In 950A, the RAN 120 determines whether to terminate the multicast session. For example, the determination of 950A can be based on whether an END message was transmitted from the application server 170. If the RAN 120 determines that the multicast session can continue in 950A, the process returns to 945A. Otherwise, if the RAN 120 determines to end the multicast session in 950A, the RAN 120 stores a current sector-formation of the cluster at the time when the multicast session is terminated, 955A. As will be described next with respect to FIG. 9B, the stored cluster from 955A can be used to more accurately gauge how to establish an 'initial engaged cluster' for a subsequent multicast session, such that the initial engaged cluster need not automatically be as large as the initial cluster, nor as small as the engaged cluster before a first registration is received (i.e., in the case of FIG. 9A, before a first registration is received the engaged cluster in 935A includes zero (0) sectors).

FIG. 9B illustrates either a continuation of the process of FIG. 9A, or a recursive continuation of a previous iteration of FIG. 9B. In the case that FIG. 9B is a continuation of the process of FIG. 9A, at some point after the multicast session in FIG. 9A terminates after 950A and the cluster at the end of the multicast session is stored by the RAN 120 in 955A, the application server 170 requests the announcement of a subsequent multicast session involving the same multicast group in 900B. Thus, blocks 900B through 930B correspond to blocks 700 through 730 of FIG. 7, respectively and/or to blocks 900A through 930A of FIG. 9A, respectively. Accordingly, the sectors of the initial cluster are determined (910B, 915B, 920B), the RAN 120 announces the multicast communication session at least within the initial cluster (925B), and at least one target AT within the initial cluster accepts the call announcement and requests registration to the announced multicast session (930B). It will be appreciated that the initial cluster formed in 915B, 920B and 925B need not be the same as the initial cluster formed in 915A, 920A and 925A of FIG. 9A, because the locations and/or group membership associations of the multicast group's ATs may have changed since the previous multicast session of FIG. 9A. In other words, the process of FIG. 6 continues to execute between and/or during the multicast session of FIG. 9A and the multicast session of FIG. 9B, which can result in adjustments to the group member list maintained by the RAN 120.

Upon receiving a first registration to the multicast session in 930B, the RAN 120 determines whether the previous multicast session for the multicast group (i.e., such as the session described above with respect to FIG. 9A, or a previous iteration of the process of FIG. 9B) occurred within a threshold period of time of the current multicast session, 935B. In an example, the RAN 120 can measure the time differential to compare against the threshold period of time from the time the previous multicast session terminated (e.g., in 950A of FIG. 9A, in 960B of FIG. 9B, etc.) to the time at which the request is received from the application server 170 in 905B, or alternatively to the time at which the first registration message is received from one of ATs 1 . . . N in 930B, in another example. The time-determination of 935B may be performed to ensure that the cluster at the end of the previous multicast session is likely to be similar to an engaged cluster for the current multicast session. For example, if the previous multicast session dropped unexpectedly 60 seconds before the current multicast session, the cluster for the previous session is very likely to still be relevant because the participating ATs will be in roughly the same locations. In another example, if the previous multicast session occurred 5 weeks earlier than the current multicast session, the cluster for the previous session is very unlikely to still be relevant because the participating ATs are not necessarily likely to be in the same approximate locations.

If the RAN 120 determines that the previous multicast session is not within the threshold period of time of the current multicast session in 935B, the process advances to block 935A of FIG. 9A, and the RAN 120 builds the engaged cluster based solely upon actual registrations received from the target ATs for the current multicast session. Otherwise, if the RAN 120 determines that the previous multicast session is within the threshold period of time of the current multicast session in 935B, the process advances to block 940B of FIG. 9B. In 940B, the RAN 120 loads the stored cluster for the previous multicast session (e.g., stored at 955A if the process of FIG. 9A corresponds to the previous multicast session, stored at 965B if a previous iteration of the process of FIG. 9B corresponds to the previous multicast session, etc.).

In 945B, the loaded cluster from 940B is used to form an 'initial engaged cluster'. As used herein, the initial engaged cluster is a hybrid cluster between (i) the initial cluster based on the group member list maintained by the RAN 120 and formed in 915B-925B, and (ii) an engaged cluster that would be based on actual registrations from target ATs. In other words, the initial engaged cluster is somewhat speculative because there is no guarantee that a cluster for a previous session will be equal to a cluster for the current session. However, the initial engaged cluster can generally be considered less speculative than the initial cluster. The initial engaged cluster is likely to be at least somewhat larger than an engaged cluster would be, and is also likely to be smaller than the initial cluster formed between 915B-925B. Also in 945B, the RAN 120 transitions the sector from which the registration(s) in 930B are received into target sectors and supporting sectors, if necessary. For example, if the registration(s) in 930B are only received from sectors that are target sectors in the initial engaged cluster, then no further transition is necessary. Alternatively, if the registration(s) in 930B are received from non-target sector(s) in the initial engaged cluster, then the initial engaged cluster is modified to transition the non-target sector(s) into target sectors, as well as populating the supporting sectors of the transitioned target sectors, if necessary.

Figure 10B:
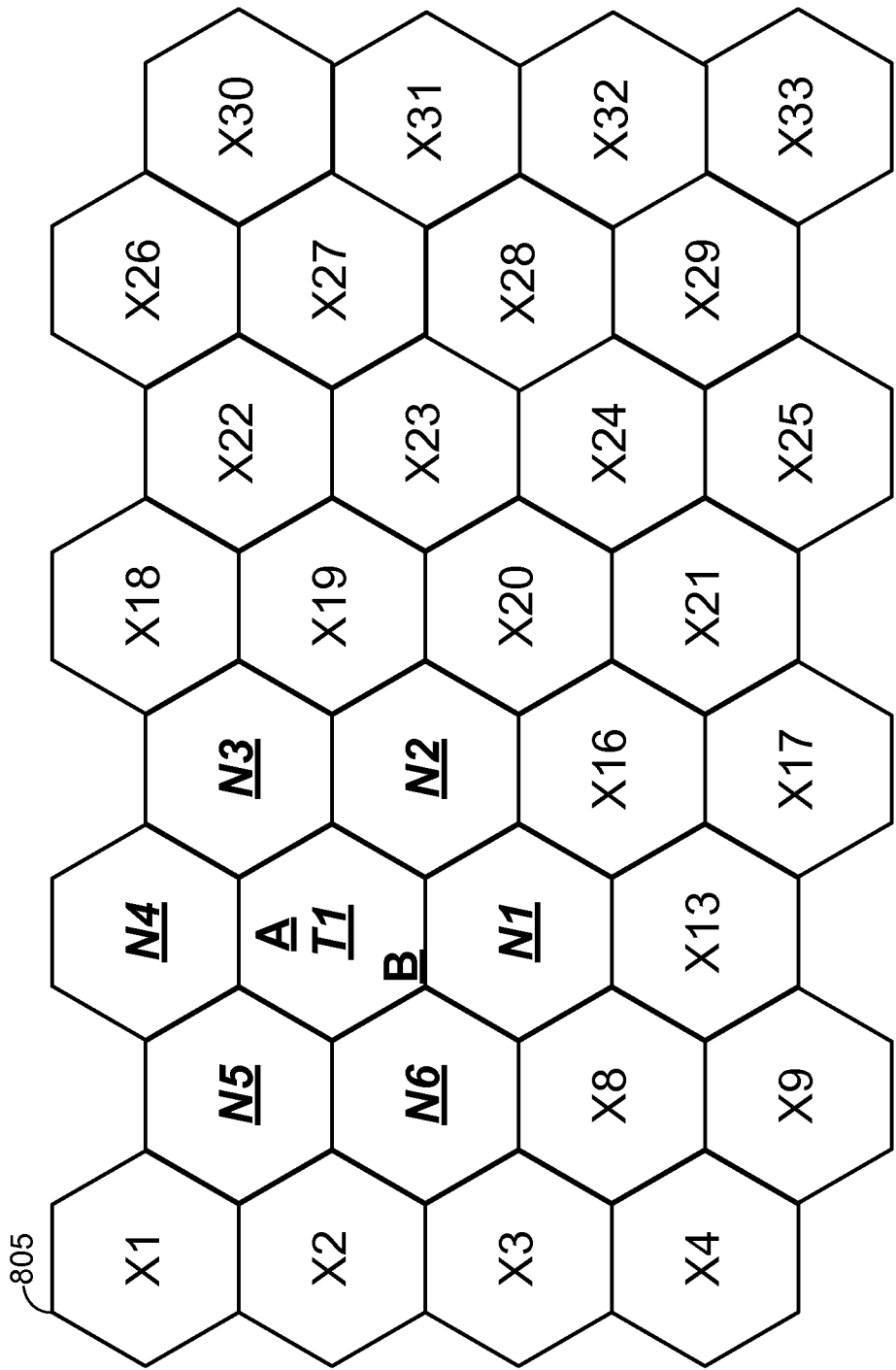
FIG. 10B illustrates an example of a stored cluster from a previous multicast communication session in accordance with an embodiment of the invention.
Figure 10C:
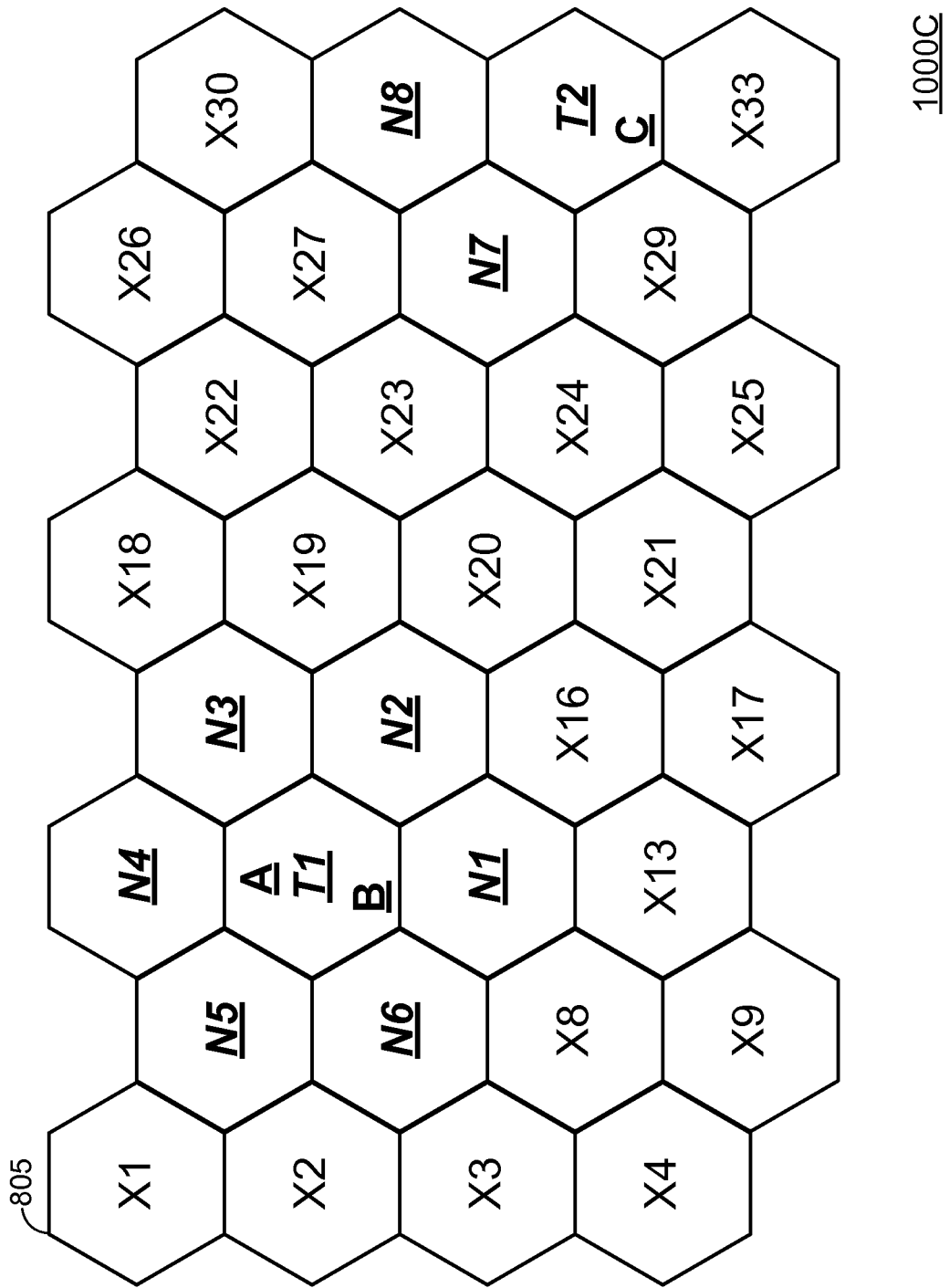
FIG. 10C illustrates an example of a cluster that is modified from the stored cluster of FIG. 10B based on a registration from a sector outside of the cluster in a current multicast communication session in accordance with an embodiment of the invention.

For example, FIG. 10B illustrates an example of the initial engaged cluster formed in 945B, with target sector T1 and supporting sectors N1 through N6. In this example, assume that an additional registration message is received from a target AT C within non-supporting sector X32 of FIG. 10B. In this case, the resultant cluster or modified-initial engaged cluster may be illustrated as in FIG. 10C, with non-supporting sector X32 transitioning into target sector T2, as well as non-supporting sectors X29 through X31 transitioning into supporting sectors N7 and N8 of T2. Below, reference is made as if the initial engaged cluster generally corresponds to the loaded cluster from the previous session. However, the initial engaged cluster can also be expanded upon as in FIG. 10C with the addition of sectors T2, N7 and N8, or alternatively can be 'pruned' as in FIG. 8B if one or more of the target or supporting sectors from the loaded cluster of the previous session are removed (while not shown explicitly in FIG. 10C, it will be readily apparent how this can be achieved from the above-disclosure).

Next, upon forming the initial engaged cluster in 945B, the RAN 120 turns on the BCH-flow for the multicast communication session within the initial engaged cluster and does not turn on the BCH-flow within sectors that belong to the initial cluster but do not belong to the initial engaged cluster, 950B. After turning on the BCH-flow in the initial engaged cluster, the RAN 120 executes target sector and supporting sector processes at the respective target and supporting sectors. Generally, each target sector and each supporting sector of the engaged cluster carries the BCMCS flow on a downlink broadcast channel BCH, and as such, in the case of FIG. 10C, the RAN 120 forwards the multicast message to base stations serving target sectors T1-T2 and the supporting sectors N1-N8.

As will be appreciated, even if the initial engaged cluster over-estimated the number of sectors for which the BCH-flow is required for supporting the multicast communication session, the initial engaged cluster relies upon actual registration messages from target ATs in a previous multicast session for its formation. As such, carrying the multicast flow in the initial engaged cluster combines some of the benefits of FIG. 9A and FIG. 7, such that the forward capacity of the RAN 120 is not as likely to be wasted as in FIG. 7, and the preemptive distribution of the BCH-flow in sectors from which explicitly registration requests have not yet been received for a current session can provide multicast messages more quickly to target ATs in those sectors upon their eventual registration.

Next, in 955B of FIG. 9B, the RAN 120 updates the sector assignments of the initial engaged cluster (e.g., adds new target/supporting sectors, removes target/supporting sectors, etc.) during the multicast communication session. Again, a more detailed description of the sector assignment updates is provided within the above-referenced co-pending application. Also, while not explicitly shown in FIG. 9B, it will be appreciated that, during the active multicast session, the RAN 120 continues to maintain/update the group member list based on GMN messages and RouteUpdate messages received from multicast group members.

In 960B, the RAN 120 determines whether to terminate the multicast session. For example, the determination of 955B can be based on whether an END message was transmitted from the application server 170. If the RAN 120 determines that the multicast session can continue in 960B, the process returns to 955B. Otherwise, if the RAN 120 determines to end the multicast session in 960B, the RAN 120 stores a current sector-formation of the cluster at the time when the multicast session is terminated, 965B. The storing step of 965B can overwrite the stored cluster from the previous multicast session, such that the newly stored cluster in 965B represents the new 'previous' session cluster for this particular multicast group. As will be appreciated, the stored cluster in 965B can be used to generate the initial engaged cluster for a next multicast session, and so on.

Also, as noted above with respect to FIG. 7, in another example, in FIGS. 9A and/or 9B, the group member list may be used to provide scheduling instructions, from the RAN 120 to multicast group members, that instruct the multicast group members with regard to how to respond to "interactive" multicast messages, such the announce messages transmitted in 930A of FIG. 9A or 930B of FIG. 9B, where an interactive multicast message is a multicast message that requests or requires feedback from one or more multicast group members. For example, if a large number of multicast group members are expected to be present within a particular sector, and an announce message for a multicast session is sent within the sector, a relatively large number of multicast group members may attempt to access the reverse link channel at the same time to respond to the announce message and register for the multicast session. However, with information present within the group member list, the RAN 120 can schedule a response sequence for the access terminals to respond to the announce message via an "access control message" (ACM). For example, the RAN 120 may send the ACM along with the announce message, with the ACM designating a prioritized response order that reserves feedback slots for a number of access terminals based on the group member list. For example, the access terminal with the most recent update to its Location Field (e.g., updated via a GMN message, a RouteUpdate message, etc.) at the group member list maintained by the RAN 120 may be granted the first response slot by the ACM, the AT having the next most recent updated Location Field may be granted the second response slot by the ACM, and so on. ACMs and scheduling of interactive multicast message feedback on the reverse link are discussed in more detail within U.S. Provisional Patent Application No. 60/974, 796, entitled "METHODS OF RESPONDING TO AN INTERACTIVE MULTICAST MESSAGE WITHIN A WIRELESS COMMUNICATION SYSTEM", filed on Sep. 24, 2007, assigned by the assignee hereof, and expressly incorporated by reference herein in its entirety.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of setting up a multicast communication session at an access network within a wireless communications system, comprising:
    transmitting an announce message announcing a current multicast communication session to a given group of access terminals within an initial cluster of sectors;
    receiving at least one registration request for the current multicast communication session from at least one access terminal belonging to the given group of access terminals;
    loading a stored cluster of sectors that supported a previous multicast communication session to the given group of access terminals; and
    turning on a multicast flow for the current multicast communication session at least within each sector of the stored cluster.

2. The method of claim 1, wherein the initial cluster of sectors includes one or more sectors expected to include one or more access terminals belonging to the given group of access terminals based on one or more location reports exchanged between the given group of access terminals and the access network.

3. The method of claim 1, wherein the stored cluster corresponds to a set of sectors that carried the multicast flow at or during termination of the previous multicast communication session.

4. The method of claim 1, further comprising:
    forming an initial engaged cluster that includes (i) each sector of the stored cluster, (ii) each target sector from which the receiving step receives at least one registration request and/or (iii) each supporting sector from which the receiving step did not receive a registration request and is in position to support transmissions of the multicast flow from one or more of the target sectors, wherein the turning on step turns on the multicast flow within each sector of the initial engaged cluster.

5. The method of claim 4, wherein the initial engaged cluster equals the stored cluster if no registrations are received in sectors outside of the stored cluster.

6. The method of claim 5, further comprising:
continuing to update the initial engaged cluster during the current multicast communication session.

7. The method of claim 6, further comprising:
storing the continually updated initial engaged cluster at or during termination of the current multicast communication session to be used as the stored cluster for a next multicast communication session.

8. The method of claim 6, wherein the continuing to update step includes expanding the initial engaged cluster to include additional sectors and/or removing sectors from the initial engaged cluster.

9. The method of claim 4, wherein the initial engaged cluster equals the stored cluster plus at least one additional sector if the receiving step receives at least one registration request from a sector outside of the stored cluster.

10. The method of claim 1, wherein the loading step includes:
determining an approximate time difference between a termination of the previous multicast communication session and a set-up of the current multicast communication session; and
determining to load the stored cluster in response to the approximate time difference being less than a threshold period of time.

11. The method of claim 10, wherein, had the approximate time difference instead been determined not to be less than the threshold period of time, the stored cluster is not loaded, such that the turning on step turns on the multicast flow without taking the stored cluster into consideration.

12. The method of claim 1,
maintaining a group member list that attempts to estimate a sector location for each group member associated with the current multicast communication session, wherein the transmitting step transmits in sectors that are selected based on the group member list,
wherein the stored cluster corresponds to a subset of the estimated sector locations of the group member list,
wherein the turning on step turns on the multicast flow in each sector of the stored cluster and any other sectors that receive registration requests,
wherein the multicast flow is not turned on within one or more sectors the estimated sector locations of the group member list that are not part of the stored cluster and do not receive the registration requests.

13. A method of supporting multicast communication sessions within a wireless communications system, comprising:
supporting a current multicast communication session associated with a given group of access terminals by carrying a multicast flow within an engaged cluster, the engaged cluster including (i) at least one target sector expected to include one or more access terminals that has registered to the current multicast communication session, and (ii) at least one supporting sector that is not a target sector and carries the multicast flow so as to support transmissions of the multicast flow from the at least one target sector;
determining to terminate the current multicast communication session;
terminating the current multicast communication session; and storing a formation of the engaged cluster at or during the termination of the current multicast communication session.

14. The method of claim 13, further comprising:
performing set-up operations for a subsequent multicast communication session associated with the given group of access terminals; and
loading the stored engaged cluster of sectors that supported the current multicast communication session to the given group of access terminals; and
turning on a multicast flow for the subsequent multicast communication session at least within each sector of the stored engaged cluster.

15. The method of claim 14, wherein the loading step includes:
determining an approximate time difference between the terminating step and the performing set-up operations step; and
determining to load the stored, engaged cluster in response to the approximate time difference being less than a threshold period of time.

16. An access network configured to set up a multicast communication session within a wireless communications system, comprising:
means for transmitting an announce message announcing a current multicast communication session to a given group of access terminals within an initial cluster of sectors;
means for receiving at least one registration request for the current multicast communication session from at least one access terminal belonging to the given group of access terminals;
means for loading a stored cluster of sectors that supported a previous multicast communication session to the given group of access terminals; and
means for turning on a multicast flow for the current multicast communication session at least within each sector of the stored cluster.

17. The access network of claim 16, further comprising:
means for forming an initial engaged cluster that includes (i) each sector of the stored cluster, (ii) each target sector from which the means for receiving receives at least one registration request and/or (iii) each supporting sector from which the means for receiving did not receive a registration request and is in position to support transmissions of the multicast flow from one or more of the target sectors,
wherein the means for turning on turns on the multicast flow within each sector of the initial engaged cluster.

18. An access network configured to support multicast communication sessions within a wireless communications system, comprising:
means for supporting a current multicast communication session associated with a given group of access terminals by carrying a multicast flow within an engaged cluster, the engaged cluster including (i) at least one target sector expected to include one or more access terminals that has registered to the current multicast communication session, and (ii) at least one supporting sector that is not a target sector and carries the multicast flow so as to support transmissions of the multicast flow from the at least one target sector;
means for determining to terminate the current multicast communication session;
means for terminating the current multicast communication session; and means for storing a formation of the engaged cluster at or during the termination of the current multicast communication session.

19. The access network of claim 18, further comprising:
means for performing set-up operations for a subsequent multicast communication session associated with the given group of access terminals; and
means for loading the stored engaged cluster of sectors that supported the current multicast communication session to the given group of access terminals; and
means for turning on a multicast flow for the subsequent multicast communication session at least within each sector of the stored engaged cluster.

20. An access network configured to set up a multicast communication session within a wireless communications system, comprising:
logic configured to transmit an announce message announcing a current multicast communication session to a given group of access terminals within an initial cluster of sectors;
logic configured to receive at least one registration request for the current multicast communication session from at least one access terminal belonging to the given group of access terminals;
logic configured to load a stored cluster of sectors that supported a previous multicast communication session to the given group of access terminals; and
logic configured to turn on a multicast flow for the current multicast communication session at least within each sector of the stored cluster.

21. The access network of claim 20, further comprising:
logic configured to form an initial engaged cluster that includes (i) each sector of the stored cluster, (ii) each target sector from which the logic configured to receive receives at least one registration request and/or (iii) each supporting sector from which the logic configured to receive did not receive a registration request and is in position to support transmissions of the multicast flow from one or more of the target sectors,
wherein the logic configured to turn on turns on the multicast flow within each sector of the initial engaged cluster.

22. An access network configured to support multicast communication sessions within a wireless communications system, comprising:
logic configured to support a current multicast communication session associated with a given group of access terminals by carrying a multicast flow within an engaged cluster, the engaged cluster including (i) at least one target sector expected to include one or more access terminals that has registered to the current multicast communication session, and (ii) at least one supporting sector that is not a target sector and carries the multicast flow so as to support transmissions of the multicast flow from the at least one target sector;
logic configured to determine to terminate the current multicast communication session;
logic configured to terminate the current multicast communication session; and
logic configured to store a formation of the engaged cluster at or during the termination of the current multicast communication session.

23. The access network of claim 22, further comprising:
logic configured to perform set-up operations for a subsequent multicast communication session associated with the given group of access terminals; and
logic configured to load the stored engaged cluster of sectors that supported the current multicast communication session to the given group of access terminals; and
logic configured to turn on a multicast flow for the subsequent multicast communication session at least within each sector of the stored engaged cluster.

24. A non-transitory computer-readable storage medium comprising instructions, which, when executed by an access network configured to set up a multicast communication session within a wireless communications system, cause the access network to perform operations, the instructions comprising:
program code to transmit an announce message announcing a current multicast communication session to a given group of access terminals within an initial cluster of sectors;
program code to receive at least one registration request for the current multicast communication session from at least one access terminal belonging to the given group of access terminals;
program code to load a stored cluster of sectors that supported a previous multicast communication session to the given group of access terminals; and
program code to turn on a multicast flow for the current multicast communication session at least within each sector of the stored cluster.

25. The non-transitory computer-readable storage medium of claim 24, further comprising:
program code to form an initial engaged cluster that includes (i) each sector of the stored cluster, (ii) each target sector from which the program code to receive receives at least one registration request and/or (iii) each supporting sector from which the program code to receive did not receive a registration request and is in position to support transmissions of the multicast flow from one or more of the target sectors,
wherein the program code to turn on turns on the multicast flow within each sector of the initial engaged cluster.

26. A non-transitory computer-readable storage medium comprising instructions, which, when executed by an access network configured to support multicast communication sessions within a wireless communications system, cause the access network to perform operations, the instructions comprising:
program code to support a current multicast communication session associated with a given group of access terminals by carrying a multicast flow within an engaged cluster, the engaged cluster including (i) at least one target sector expected to include one or more access terminals that has registered to the current multicast communication session, and (ii) at least one supporting sector that is not a target sector and carries the multicast flow so as to support transmissions of the multicast flow from the at least one target sector;
program code to determine to terminate the current multicast communication session;
program code to terminate the current multicast communication session; and
program code to store a formation of the engaged cluster at or during the termination of the current multicast communication session.

27. The non-transitory computer-readable storage medium of claim 26, further comprising:
program code to perform set-up operations for a subsequent multicast communication session associated with the given group of access terminals; and program code to load the stored engaged cluster of sectors that supported the current multicast communication session to the given group of access terminals; and program code to turn on a multicast flow for the subsequent multicast communication session at least within each sector of the stored engaged cluster.

\* \* \* \* \*